US012051847B2

(12) United States Patent
Tada et al.

(10) Patent No.: US 12,051,847 B2
(45) Date of Patent: Jul. 30, 2024

(54) DIELECTRIC RESONATOR, DIELECTRIC FILTER, AND MULTIPLEXER

(71) Applicant: Murata Manufacturing Co., Ltd., Nagaokakyo (JP)

(72) Inventors: Hitoshi Tada, Nagaokakyo (JP); Yasuo Yamada, Nagaokakyo (JP); Muneyoshi Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/715,097

(22) Filed: Apr. 7, 2022

(65) Prior Publication Data

US 2022/0231395 A1 Jul. 21, 2022

Related U.S. Application Data

(63) Continuation of application No. PCT/JP2020/039653, filed on Oct. 22, 2020.

(30) Foreign Application Priority Data

Nov. 29, 2019 (JP) ................................ 2019-216297

(51) Int. Cl.
*H01P 1/203* (2006.01)
*H01P 7/04* (2006.01)
*H01P 7/10* (2006.01)

(52) U.S. Cl.
CPC .............. *H01P 7/105* (2013.01); *H01P 1/203* (2013.01); *H01P 7/04* (2013.01)

(58) Field of Classification Search
CPC ........ H01P 1/2002; H01P 1/202; H01P 1/205; H01P 1/2053; H01P 1/2056;
(Continued)

(56) References Cited

U.S. PATENT DOCUMENTS 4,692,726 A * 9/1987 Green .................. H01P 1/2136
333/202
5,408,053 A * 4/1995 Young ................. H05K 1/0265
174/262
(Continued)

FOREIGN PATENT DOCUMENTS

JP H01241901 A 9/1989
JP 05-090811 A 4/1993
(Continued)

OTHER PUBLICATIONS

Official Communication issued in International Patent Application No. PCT/JP2020/039653, mailed on Jan. 26, 2021.
Office Action in JP2021-561223, mailed Jul. 26, 2022, 8 pages.

*Primary Examiner* — Stephen E. Jones
(74) *Attorney, Agent, or Firm* — Keating & Bennett, LLP

(57) ABSTRACT

A dielectric resonator includes a dielectric substrate, a distributed element, and a shield conductor portion. The distributed element extends in the X-axis direction inside the dielectric substrate. The shield conductor portion is on a surface of the dielectric substrate and winds around the distributed element when the distributed element is viewed from the X-axis direction in plan view. One end of the distributed element is not connected to the shield conductor portion. The distributed element includes a plurality of conductors.

19 Claims, 28 Drawing Sheets

(58) Field of Classification Search
CPC .......... H01P 1/2088; H01P 1/20; H01P 1/201; H01P 1/203; H01P 3/16; H01P 3/122; H01P 7/00; H01P 7/04; H01P 7/08; H03H 7/01; H03H 7/0138; H03H 7/0153; H03H 7/0161; H03H 2007/013; H03H 2007/0192
See application file for complete search history.

(56) References Cited

U.S. PATENT DOCUMENTS

| | | | | |
|---|---|---|---|---|
| 6,148,221 | A | 11/2000 | Ishikawa et al. | |
| 2001/0004228 | A1 | 6/2001 | Hirai et al. | |
| 2013/0249650 | A1* | 9/2013 | Bianchi | H03H 7/38 333/32 |
| 2014/0266491 | A1* | 9/2014 | Devnani | H05K 1/0253 333/17.3 |

FOREIGN PATENT DOCUMENTS

| | | | |
|---|---|---|---|
| JP | 06-140804 | A | 5/1994 |
| JP | 06-252606 | A | 9/1994 |
| JP | 07-066078 | A | 3/1995 |
| JP | 2000-196310 | A | 7/2000 |
| JP | 2001-177306 | A | 6/2001 |
| JP | 2003-218604 | A | 7/2003 |
| JP | 2007-235465 | A | 9/2007 |
| WO | 9506336 | A1 | 3/1995 |

* cited by examiner

DIELECTRIC RESONATOR, DIELECTRIC FILTER, AND MULTIPLEXER

CROSS REFERENCE TO RELATED APPLICATIONS

This application claims the benefit of priority to Japanese Patent Application No. 2019-216297 filed on Nov. 29, 2019 and is a Continuation Application of PCT Application No. PCT/JP2020/039653 filed on Oct. 22, 2020. The entire contents of each application are hereby incorporated herein by reference.

BACKGROUND OF THE INVENTION

1. Field of the Invention

The present invention relates to a dielectric resonator, a dielectric filter, and a multiplexer including the dielectric filter.

2. Description of the Related Art

Dielectric resonators have been known. For example, Japanese Unexamined Patent Application Publication No. 5-90811 discloses a coaxial dielectric resonator. In the coaxial dielectric resonator, an outer conductor that is a conductive member is formed on the outer peripheral surface of a dielectric member and an inner conductor is formed with conductive paste filled into a through hole of the coaxial dielectric member. With the inner conductor having high conductivity, calories due to loss generated in the coaxial dielectric resonator can be effectively dissipated to the outside of the coaxial dielectric resonator. With the coaxial dielectric resonator, a reduction in Q factor due to miniaturization can be reduced.

The frequency characteristics of a dielectric filter (for example, bandpass characteristics or attenuation characteristics) are often formed by a plurality of dielectric resonators. In such a case, the performance of the dielectric filter depends on the steepness of the dielectric resonators. Thus, to achieve a further reduction in loss of the dielectric filter, it is necessary to further improve the Q factors indicating the steepness of the dielectric resonators.

SUMMARY OF THE INVENTION

Preferred embodiments of the present invention provide improvements in Q factor of dielectric resonators and a reduction in loss of dielectric filters.

A dielectric resonator according to a preferred embodiment of the present invention includes a dielectric substrate, a distributed element, and a shield conductor portion. The distributed element extends in a first direction inside the dielectric substrate. The shield conductor portion is on a surface of the dielectric substrate and winds around the distributed element when the distributed element is viewed from the first direction in plan view. One end of the distributed element is not connected to the shield conductor portion. The distributed element includes a plurality of conductors.

A dielectric filter according to a preferred embodiment of the present invention includes a dielectric substrate, a plurality of distributed elements, a first terminal, a second terminal, and a shield conductor portion. The plurality of distributed elements extend in a first direction inside the dielectric substrate. The first terminal and the second terminal are electrically connected to the plurality of distributed elements. The shield conductor portion is on a surface of the dielectric substrate and winds around the plurality of distributed elements when the plurality of distributed elements are viewed from the first direction in plan view. One end of each of the plurality of distributed elements is not connected to the shield conductor portion. At least one distributed element of the plurality of distributed elements includes a plurality of conductors. The dielectric substrate includes a plurality of dielectric layers stacked in a second direction orthogonal or substantially orthogonal to the first direction. The plurality of conductors each define a distributed constant line that extends in the first direction and the second direction is a normal thereof. The plurality of conductors are on at least 13 dielectric layers of the plurality of dielectric layers.

With the dielectric resonators according to preferred embodiments of the present invention, the distributed element includes the plurality of conductors so that an improvement in Q factor is able to be achieved.

With the dielectric filters according to preferred embodiments of the present invention, the distributed element includes the plurality of conductors so that a reduction in loss is able to be achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
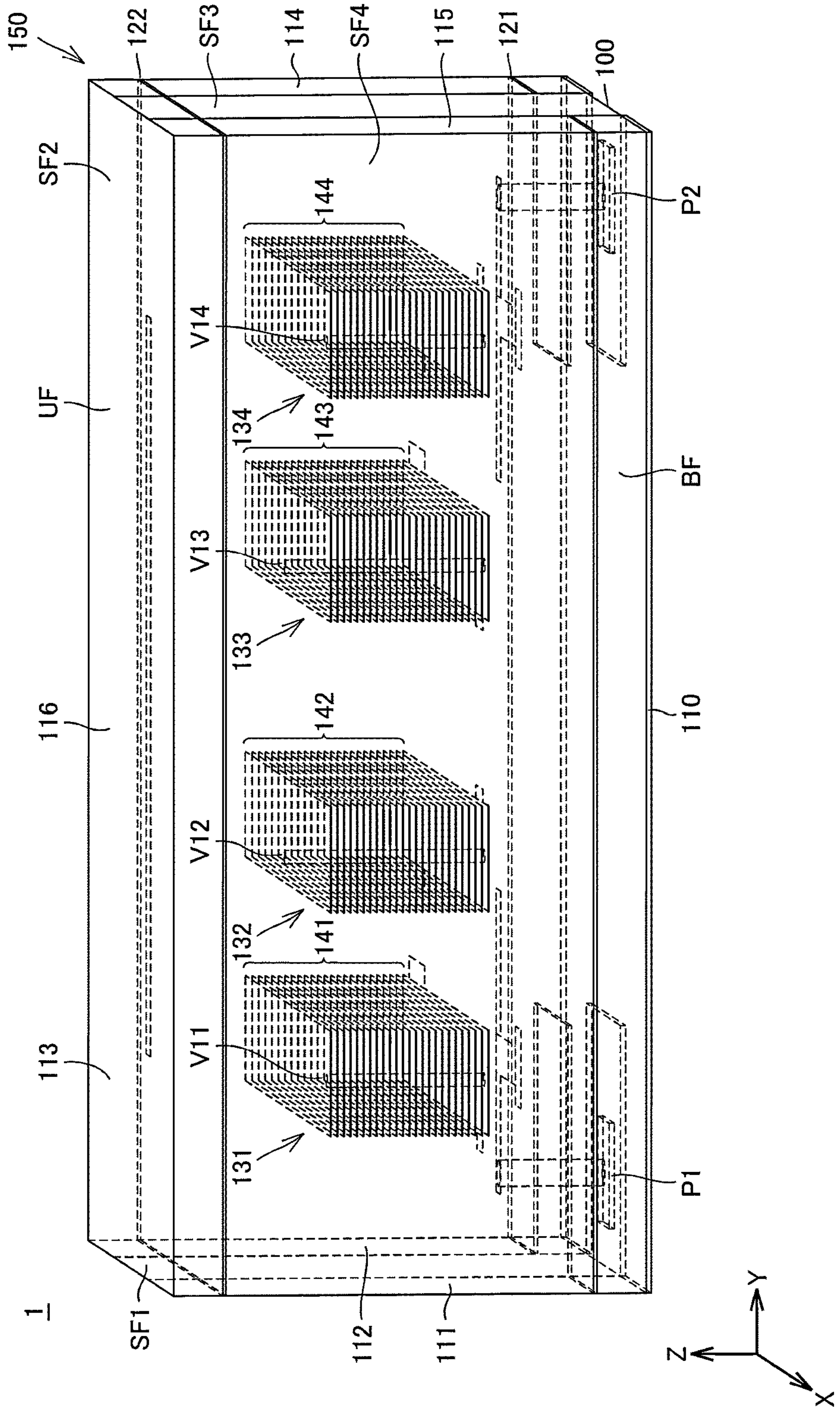
FIG. 1 is an external perspective view of a dielectric filter 1 according to Preferred Embodiment 1 of the present invention.

Preferred embodiments of the present invention are described in detail below with reference to the drawings. In the drawings, the same or corresponding portions and elements are denoted by the same reference characters and the repetitive description thereof is generally omitted.

Preferred Embodiment 1

Figure 2:
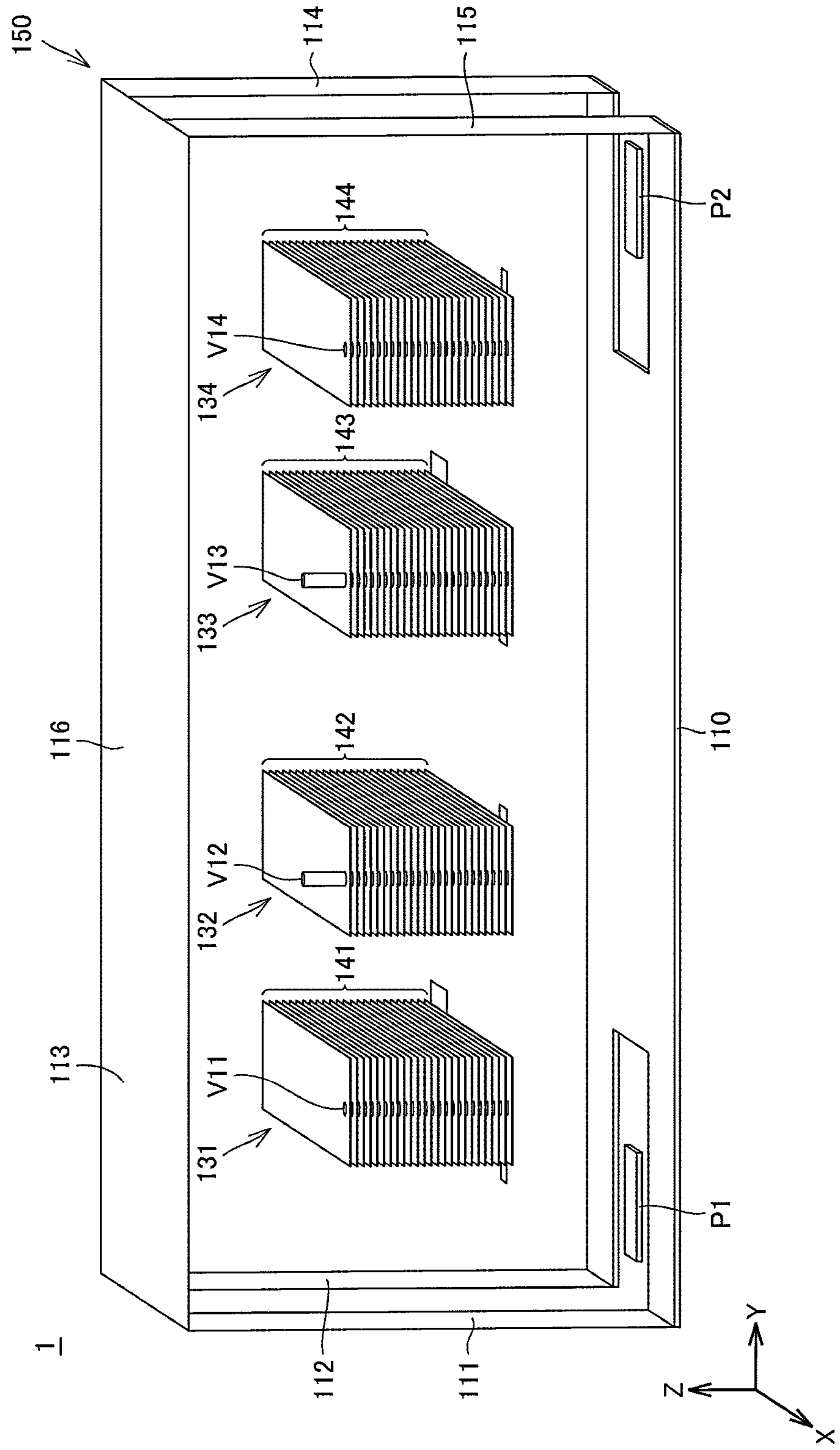
FIG. 2 is a perspective view of the dielectric filter 1 according to Preferred Embodiment 1 of the present invention.

FIG. 1 and FIG. 2 are perspective views of a dielectric filter 1 according to Preferred Embodiment 1 of the present invention. In FIG. 1 and FIG. 2, the X axis, the Y axis, and the Z axis are orthogonal or substantially orthogonal to each other. The same is also true for FIG. 4, FIG. 6 to FIG. 16, FIG. 18 to FIG. 21, FIG. 24 to FIG. 29, FIG. 31, and FIG. 32, which are described later.

With reference to FIG. 1 and FIG. 2, the dielectric filter 1 has, for example, a rectangular or substantially rectangular parallelepiped shape. The dielectric filter 1 includes a dielectric substrate 100, distributed elements 131 to 134, a shield conductor portion 150, ground electrodes 121 and 122, an input/output terminal P1 (first terminal), and an input/output terminal P2 (second terminal). In FIG. 2, to make the distributed elements 131 to 134 inside the dielectric filter 1 easier to see, the illustration of the dielectric substrate 100 of FIG. 1 is omitted. The illustration of the dielectric substrate is also omitted in FIG. 4, FIG. 6, FIG. 8, FIG. 15, FIG. 16, FIG. 18 to FIG. 21, FIG. 24, FIG. 29, and FIG. 32.

The dielectric substrate 100 includes a plurality of dielectric layers stacked in the Z-axis direction (second direction). The distributed elements 131 to 134 each extend in the X-axis direction (first direction) inside the dielectric substrate 100. The X-axis direction length, Y-axis direction length, and Z-axis direction length of each of the distributed elements 131 to 134 are the same or substantially the same as the X-axis direction lengths, Y-axis direction lengths, and Z-axis direction lengths of the other distributed elements, respectively. The distributed elements 131 to 134 are linearly disposed in this order in the Y-axis direction (third direction) between the ground electrodes 121 and 122. Note that the distributed elements 131 to 134 are not necessarily linearly disposed and may be disposed in a diamond or staggered (zigzag) shape, for example.

The input/output terminals P1 and P2 are electrically connected to the distributed elements 131 and 134, respectively, with via conductors and line conductors interposed therebetween. A signal input to the input/output terminal P1 is output from the input/output terminal P2. A signal input to the input/output terminal P2 is output from the input/output terminal P1. The case where two circuit elements are electrically connected to each other includes a case where the two circuit elements are directly connected to each other and a case where the two circuit elements are coupled to each other through an electric field.

The outermost surfaces of the dielectric filter 1 in the Z-axis direction are referred to as upper surface UF and lower surface BF. The upper surface UF and the lower surface BF face each other in the Z-axis direction. The surfaces parallel or substantially parallel to the Z-axis direction and the ZX plane are referred to as side surfaces SF1 and SF3. The surfaces parallel or substantially parallel to the Z-axis direction and the YZ plane are referred to as side surfaces SF2 and SF4.

On the lower surface BF, the input/output terminals P1 and P2 and a ground terminal 110 are provided. The input/output terminals P1 and P2 and the ground terminal 110 are, for example, land grid array (LGA) terminals with plane electrodes regularly provided on the lower surface BF. The lower surface BF is connected to a circuit board, which is not illustrated.

On the upper surface UF, a shield electrode 116 is provided. The shield electrode 116 covers the upper surface UF.

On the side surface SF1, shield electrodes 111 and 112 are provided. The shield electrodes 111 and 112 are spaced away from each other in the X-axis direction. The shield electrodes 111 and 112 are each connected to the ground terminal 110, the ground electrodes 121 and 122, and the shield electrode 116.

On the side surface SF3, shield electrodes 114 and 115 are provided. The shield electrodes 114 and 115 are spaced away from each other in the X-axis direction. The shield electrodes 114 and 115 are each connected to the ground terminal 110, the ground electrodes 121 and 122, and the shield electrode 116.

On the side surface SF2, a shield electrode 113 is provided. The shield electrode 113 covers the side surface SF2. The shield electrode 113 is connected to the ground terminal 110, the ground electrodes 121 and 122, and the shield electrodes 112, 114, and 116.

On the side surface SF4, no shield electrode is provided.

The ground terminal 110 and the shield electrodes 111 to 116 define the shield conductor portion 150. When the shield conductor portion 150 is viewed from the X-axis direction in plan view, the shield conductor portion 150 is provided on the surface of the dielectric substrate 100 to wind around the distributed elements 131 to 134.

The end portion on the side surface SF4 side (one end) of each of the distributed elements 131 to 134 is not connected to the shield conductor portion 150. That is, one end of each of the distributed elements 131 to 134 is an open end that may have a variable voltage. Meanwhile, the end portion on the side surface SF2 side (other end) of each of the distributed elements 131 to 134 is connected to the shield electrode 113. That is, the other end of each of the distributed elements 131 to 134 is a fixed end at a voltage fixed to the reference voltage of the shield conductor portion 150.

The X-axis direction length of each of the distributed elements 131 to 134 is approximately one fourth of the wavelength of a desired signal that can pass through the dielectric filter 1. That is, the distributed elements 131 to 134 are each a $\lambda/4$ resonator. The dielectric filter 1 is a four-stage dielectric filter including the four $\lambda/4$ resonators. The number of the stages (the number of the resonators) of the dielectric filter 1 may be two, three, five, or more.

The distributed elements 131 to 134 include respective pluralities of conductors 141 to 144. The plurality of conductors 141 each define a distributed constant line that extends in the X-axis direction and has the Z-axis direction as the normal thereof. The plurality of conductors 141 are each provided on any of the plurality of dielectric layers of the dielectric substrate 100. That is, the plurality of conductors 141 are stacked in the Z-axis direction with an interval corresponding to the dielectric layer thickness. With regard to the plurality of conductors 141, the intervals between the conductors adjacent to each other in the Z-axis direction may be different from each other. The pluralities of conductors 142 to 144 are each configured the same as or similar to the plurality of conductors 141.

The distributed elements 131 to 134 include respective via conductors V11 to V14. At the one end of the distributed element 131, the plurality of conductors 141 are connected to each other by the via conductor V11 (short circuit conductor portion). At the one end of the distributed element 132, the plurality of conductors 142 are connected to each other by the via conductor V12 (short circuit conductor portion). At the one end of the distributed element 133, the plurality of conductors 143 are connected to each other by the via conductor V13 (short circuit conductor portion). At the one end of the distributed element 134, the plurality of conductors 144 are connected to each other by the via conductor V14 (short circuit conductor portion).

At the open end of each of the distributed elements 131 to 134, the plurality of conductors of the distributed element are connected to each other so that the potentials (polarities) of the plurality of respective conductors are matched with each other. Thus, the resonant modes of currents that flow through the plurality of respective conductors can be matched with each other. As a result, the directions in which currents flow through the plurality of respective conductors can be matched with each other.

Figure 3:
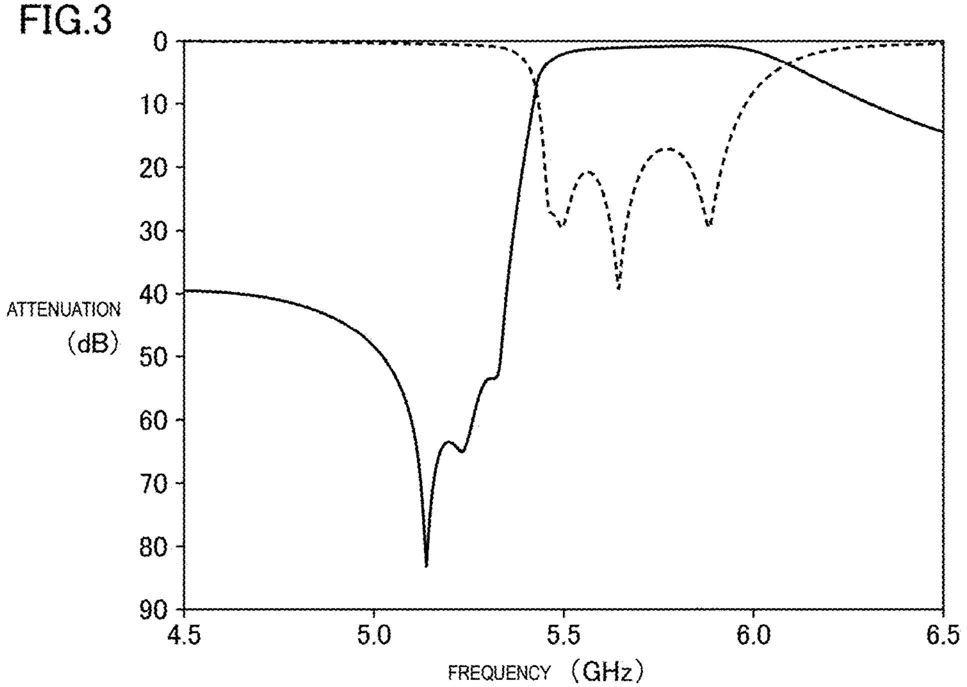
FIG. 3 is a diagram illustrating the bandpass characteristics (solid line) and reflection characteristics (dotted line) of the dielectric filter of FIG. 1.

FIG. 3 is a diagram illustrating the bandpass characteristics (solid line) and reflection characteristics (dotted line) of the dielectric filter 1 of FIG. 1. The bandpass characteristics are the frequency characteristics of insertion loss. The reflection characteristics are the frequency characteristics of return loss. As illustrated in FIG. 3, for example, the pass band is between about 5.5 GHz and about 6.0 GHz and the attenuation pole is between about 5.0 GHz and about 5.3 GHz.

Figure 4:
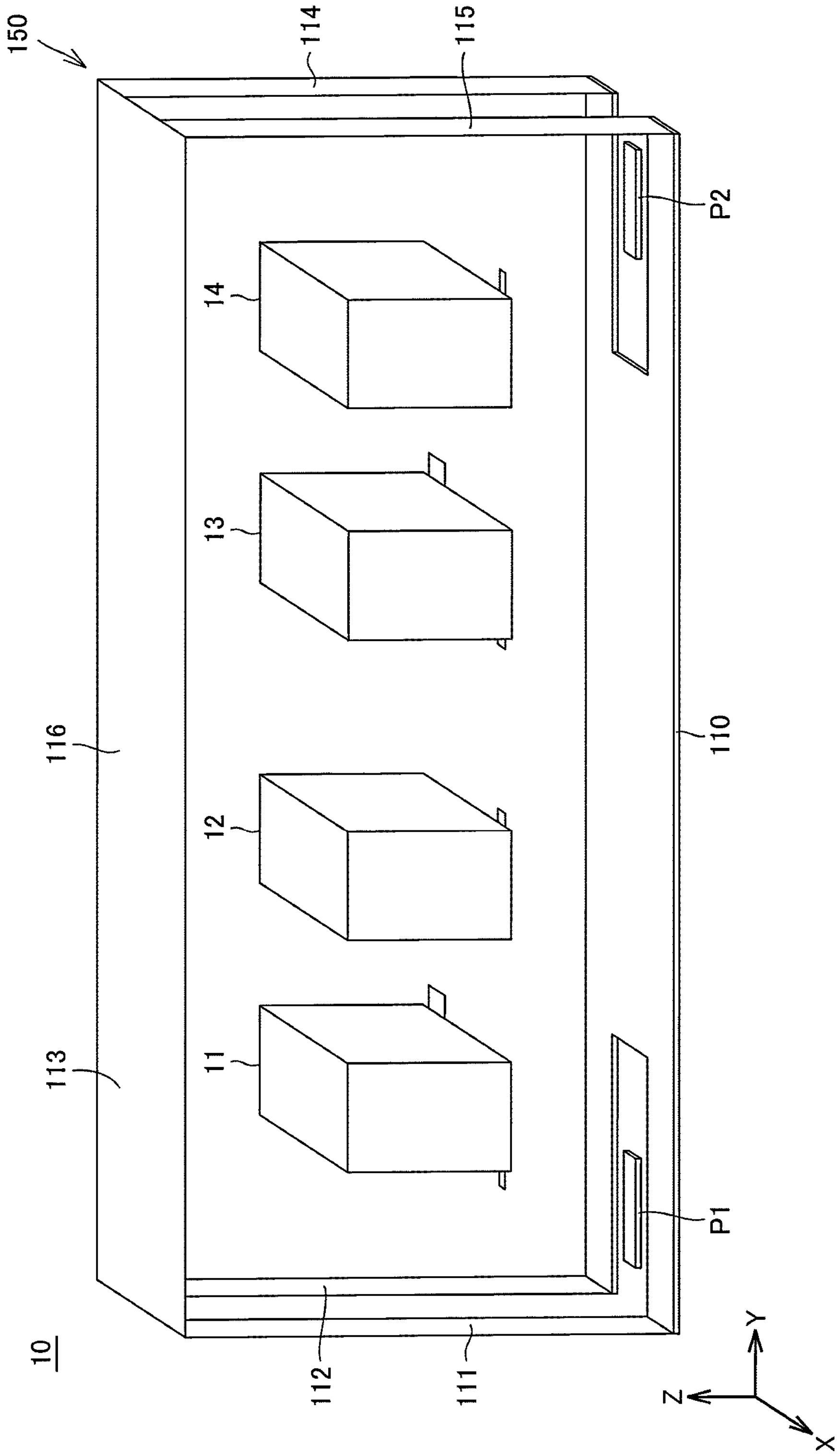
FIG. 4 is a perspective view of a dielectric filter according to Comparative Example 1.

FIG. 4 is a perspective view of a dielectric filter 10 according to Comparative Example 1. The dielectric filter 10 has a configuration in which the distributed elements 131 to 134 of the dielectric filter 1 of FIG. 1 are replaced by respective distributed elements 11 to 14. The remaining configuration is the same or substantially the same as in Preferred Embodiment 1 so that the repetitive description thereof is omitted. As illustrated in FIG. 4, the distributed elements 11 to 14 each include a single bulk material whose interior is filled. The X-axis direction length, Y-axis direction length, and Z-axis direction length of the bulk member are the same or substantially the same as the X-axis direction length, Y-axis direction length, and Z-axis direction length of each of the distributed elements 131 to 134 of FIG. 1, respectively.

Figure 5:
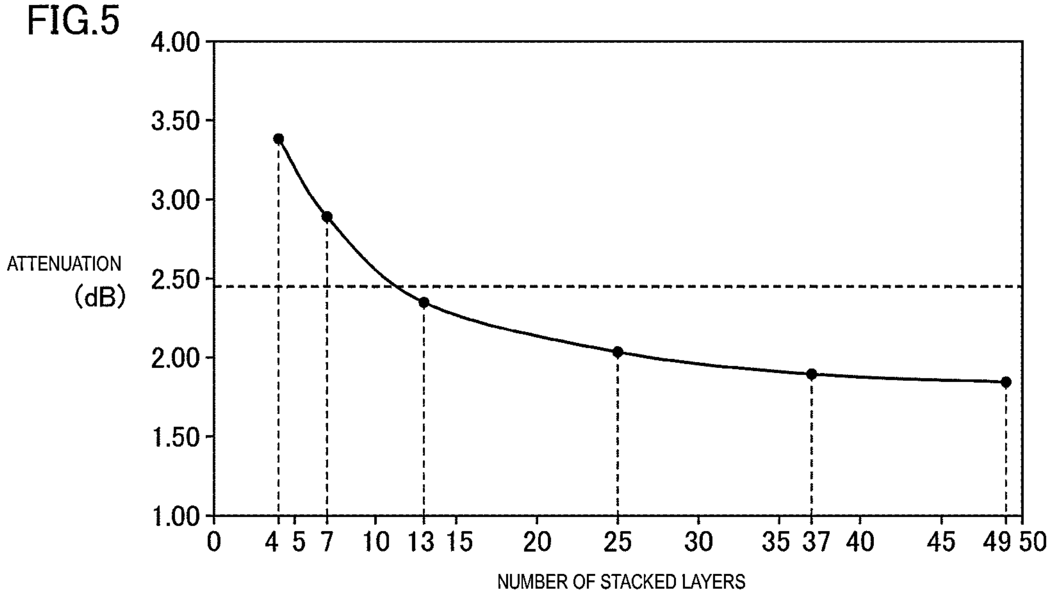
FIG. 5 is a diagram illustrating the minimum value of the insertion loss of the dielectric filter of FIG. 1 (solid line) and the minimum value of the insertion loss of the dielectric filter of FIG. 4 (dotted line).

FIG. 5 is a diagram illustrating the minimum value of the insertion loss of the dielectric filter 1 of FIG. 1 (solid line) and the minimum value of the insertion loss of the dielectric filter 10 of FIG. 4 (dotted line). With regard to the minimum value of the insertion loss of the dielectric filter 1 of FIG. 1, values are indicated in a case where, with the distributed elements 131 to 134 having a certain Z-axis direction length (height) and the conductors each having a certain Z-axis direction length (thickness), the number of divided segments of the dielectric in which the pluralities of conductors 141 to 144 are each provided (the number of stacked layers) is changed. As the number of stacked layers is increased, the intervals between the conductors adjacent to each other in the Z-axis direction of each of the pluralities of conductors 141 to 144 are narrowed. As illustrated in FIG. 5, when the number of stacked layers is 13 or more, for example, the insertion loss of the dielectric filter 1 is smaller than the insertion loss of the dielectric filter 10.

In each of the distributed elements 131 to 134 of FIG. 1, the plurality of conductors are disposed with intervals in the Z-axis direction. Thus, the volume of the plurality of conductors of the distributed element is smaller than the volume of each of the distributed elements 11 to 14 of FIG. 4.

In this respect, it has been known that high frequency signals do not flow through an entire conductor but flow through the surface portion of the conductor (skin effect). In each of the distributed elements 131 to 134 of FIG. 1, although no current flows between the conductors adjacent to each other in the Z-axis direction, the skin portion of each conductor through which a current flows is increased. That is, a distributed element provided as a multilayer body including a plurality of conductors can have a larger surface area through which high frequency signals can pass. As a result, the Q factor of a dielectric resonator including the distributed element can be increased so that the insertion loss of a dielectric filter including the dielectric resonator can be reduced.

From the viewpoint of the skin effect, to ensure a region through which a current flows, the thickness of the conductor of each of the distributed elements 131 to 134 is preferably larger than a skin depth δ of the conductor. The skin depth δ of the conductor indicates a depth from the surface (skin) of the conductor at which a current drops to the reciprocal of a natural logarithm e (approximately 36.7%) as compared to that on the surface. The skin depth δ is expressed as Expression (1) using a resistivity ρ, a permeability $\mu_r$, a vacuum permeability $\mu_0$ ($4\pi\times10^{-7}$), and an angular frequency ω (2π times as large as a frequency f of a high frequency signal) of the conductor.

$$\delta = \sqrt{\frac{2\rho}{\omega\mu_r\mu_0}} \tag{1}$$

From the above, with the dielectric filter according to Preferred Embodiment 1, a reduction in loss can be achieved.

Preferred Embodiment 2

In Preferred Embodiment 1, the dielectric filter in which the plurality of distributed elements each has the multilayer structure including the plurality of conductors is described. In Preferred Embodiment 2 of the present invention, a dielectric resonator including a single distributed element having a multilayer structure including a plurality of conductors is described.

Figure 6:
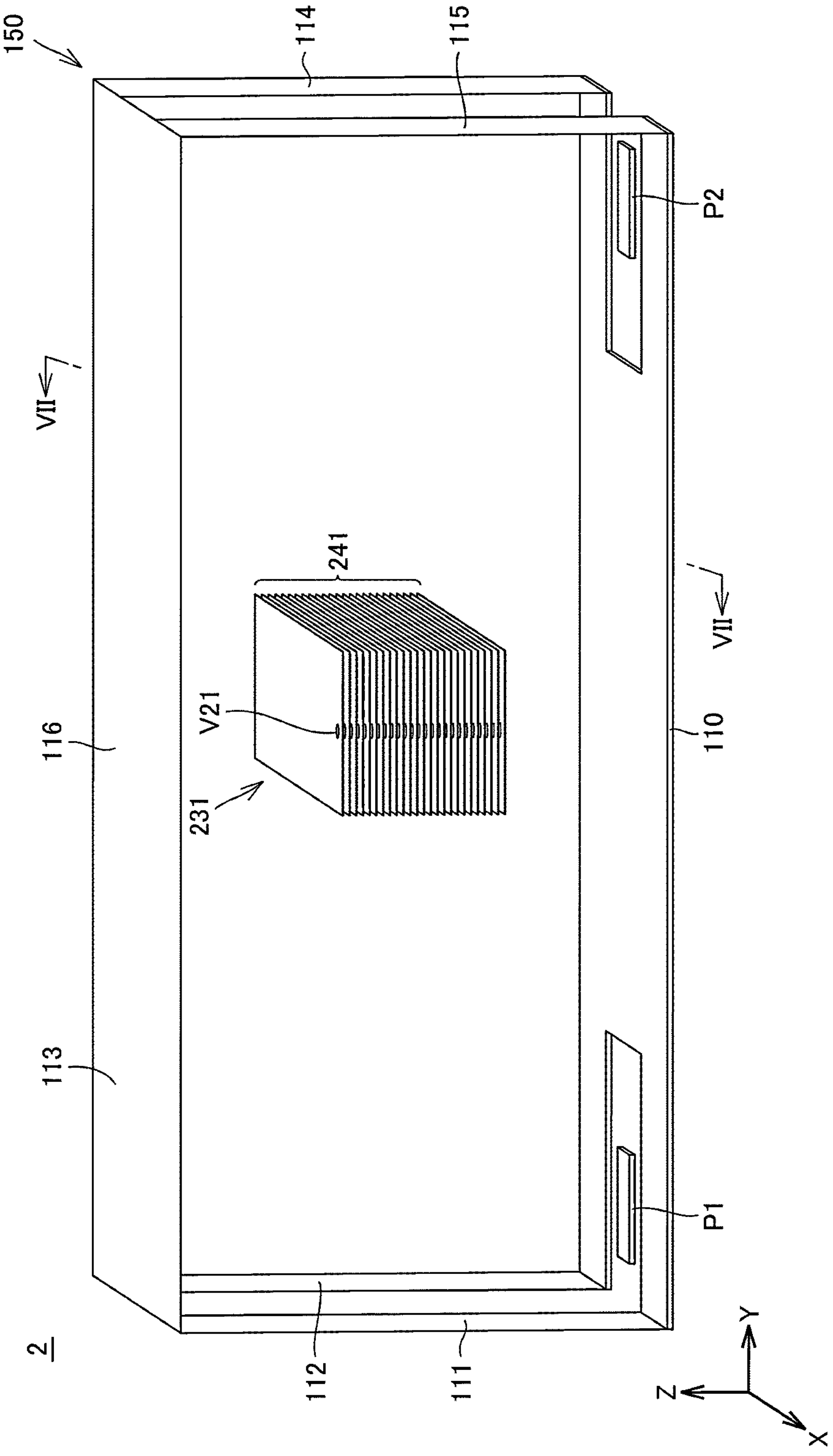
FIG. 6 is a perspective view of a dielectric resonator according to Preferred Embodiment 2 of the present invention.
Figure 7:
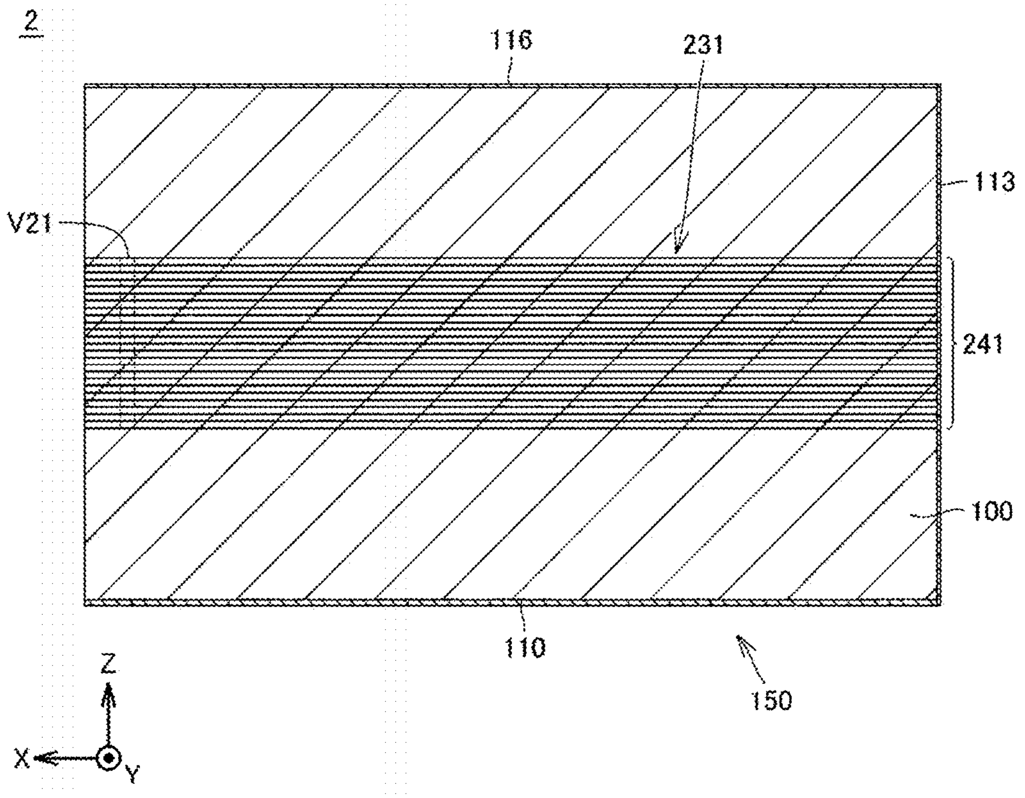
FIG. 7 is a sectional view taken along the line VII-VII of FIG. 6.

FIG. 6 is a perspective view of a dielectric resonator 2 according to Preferred Embodiment 2. FIG. 7 is a sectional view taken along the line VII-VII of FIG. 6. The dielectric resonator 2 has a configuration in which the distributed elements 131 to 134 of the dielectric filter 1 of FIG. 1 and FIG. 2 are replaced by a distributed element 231. The remaining configuration is the same or substantially the same as in Preferred Embodiment 1 so that the repetitive description thereof is omitted.

As illustrated in FIG. 6 and FIG. 7, the distributed element 231 includes a plurality of conductors 241 and a via conductor V21 (short circuit conductor portion). The plurality of conductors 241 each define a distributed constant line that extends in the X-axis direction and has the Z-axis direction as the normal thereof. The plurality of conductors 241 are each provided on any of the plurality of dielectric layers of the dielectric substrate 100.

One end of the distributed element 231 is not connected to the shield conductor portion 150. That is, the one end of the distributed element 231 is an open end that may have a variable voltage. At the one end of the distributed element 231, the plurality of conductors 241 are connected to each other by the via conductor V21.

The other end of the distributed element 231 is connected to the shield electrode 113. That is, the other end of the distributed element 231 is a fixed end at a voltage fixed to the reference voltage of the shield conductor portion 150.

The X-axis direction length of the distributed element 231 is approximately one fourth of the wavelength of a signal that the dielectric resonator 2 resonates. That is, the dielectric resonator 2 is a λ/4 resonator.

With reference to FIG. 7, the X-axis direction length of each of the plurality of conductors 241 is equal or substantially equal to the X-axis direction length of the dielectric substrate 100. In the manufacturing process of the dielectric resonator 2, a cutting operation to determine the X-axis direction lengths of the plurality of conductors 241 and a cutting operation for determining the X-axis direction length of the dielectric substrate 100 can be performed integrally so that the manufacturing variations of the dielectric substrate 100 can be reduced or prevented.

Figure 8:
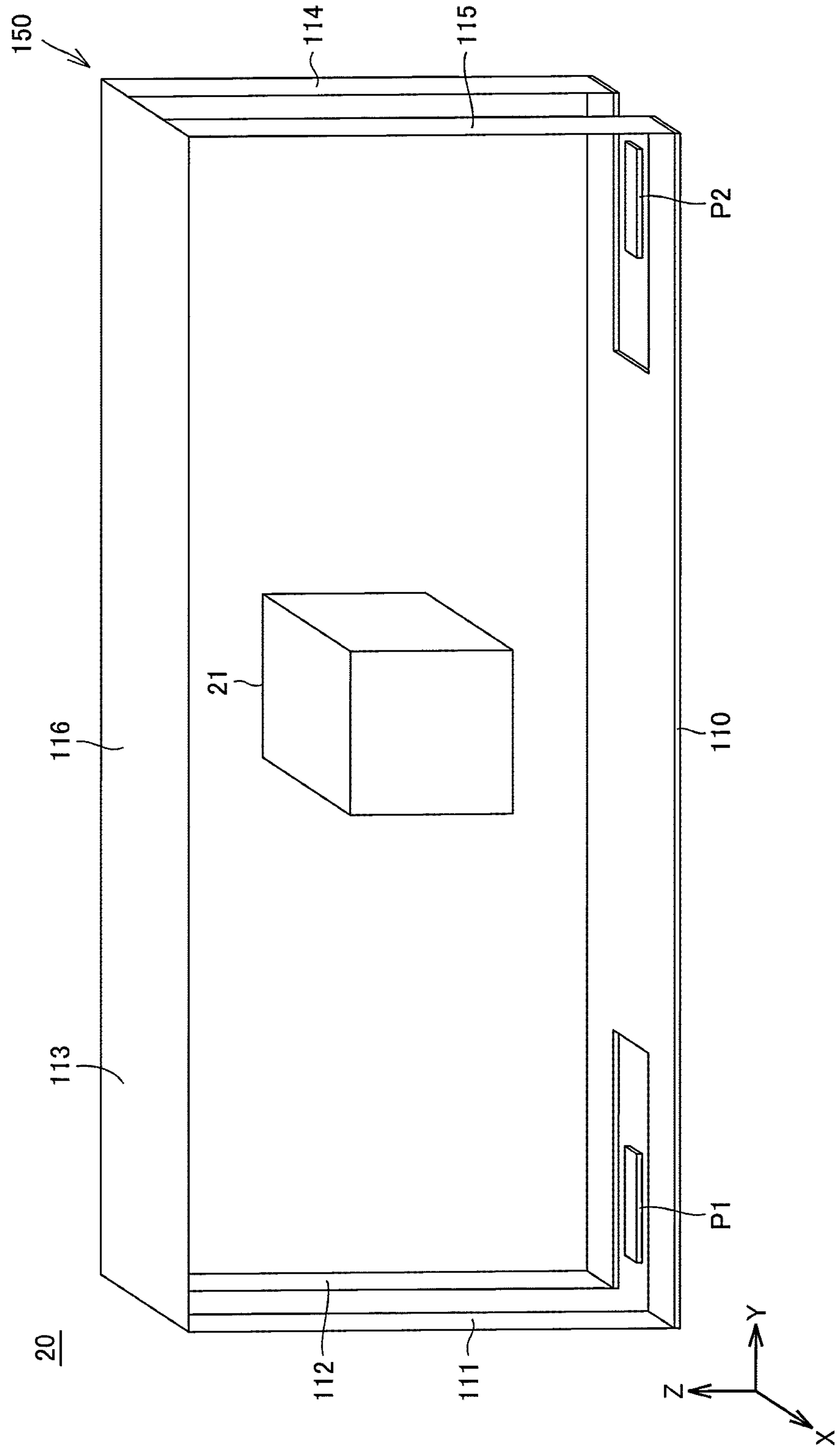
FIG. 8 is a perspective view of a dielectric resonator according to Comparative Example 2.

FIG. 8 is a perspective view of a dielectric resonator 20 according to Comparative Example 2. The dielectric resonator 20 has a configuration in which the distributed element 231 of FIG. 6 is replaced by a distributed element 21. The remaining configuration is the same or substantially the same as in Preferred Embodiment 2 so that the repetitive description thereof is omitted.

As illustrated in FIG. 8, the distributed element 21 includes a single bulk material whose interior is filled. The X-axis direction length, Y-axis direction length, and Z-axis direction length of the distributed element 21 are the same or substantially the same as the X-axis direction length, Y-axis direction length, and Z-axis direction length of the distributed element 231 of FIG. 6, respectively.

Figure 9:
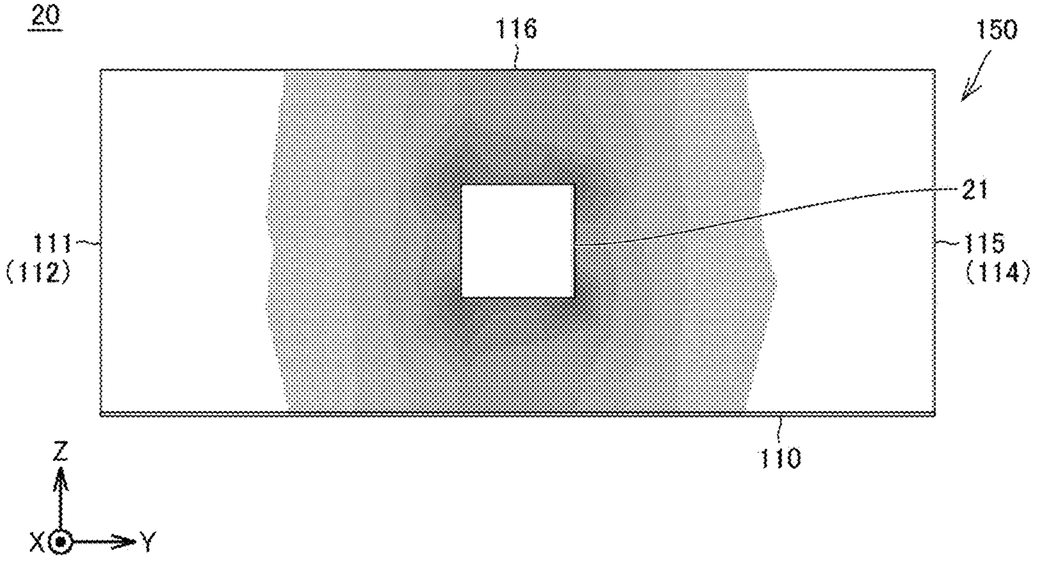
FIG. 9 is a plan view of the distribution of field strengths (kV/m) in a simulation in which a high frequency signal is passed through a distributed element of FIG. 8 when viewed from the X-axis direction.
Figure 10:
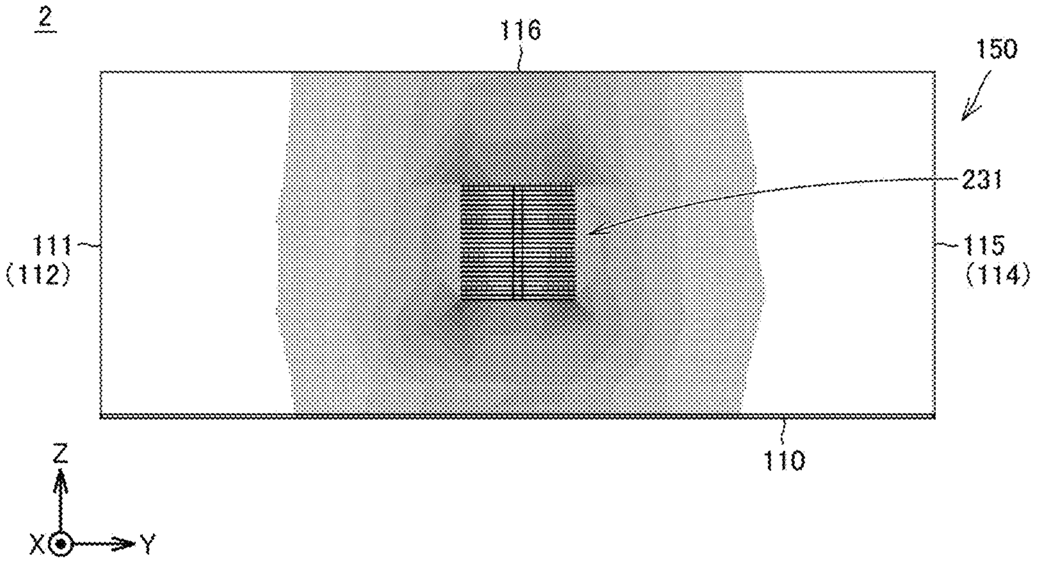
FIG. 10 is a plan view of the distribution of field strengths in a simulation in which a high frequency signal is passed through a distributed element of FIG. 6 when viewed from the X-axis direction.

FIG. 9 is a plan view of the distribution of field strengths (kV/m) in a simulation in which a high frequency signal is passed through the distributed element 21 of FIG. 8 when viewed from the X-axis direction. FIG. 10 is a plan view of the distribution of field strengths in a simulation in which a high frequency signal is passed through the distributed element 231 of FIG. 6 when viewed from the X-axis direction. In FIG. 9 and FIG. 10, the closer the colors of the regions are from white to black, the stronger the field strengths in the regions. The same is also true for FIG. 25 to FIG. 28.

As illustrated in FIG. 9, due to the skin effect, the electric field is concentrated on the surface of the distributed element 21 and almost no current flows into the distributed element 21. Meanwhile, as illustrated in FIG. 10, with regard to the distributed element 231, the electric field is also generated inside the distributed element 231. The distributed element 231, in which the plurality of conductors 241 are stacked at intervals, is larger in surface area through which high frequency signals can pass than the distributed element 21. With the increase in region through which high frequency signals can pass, the Q factor of the dielectric resonator 2 can be improved as compared to the Q factor of the dielectric resonator 20.

With the dielectric resonator 2, the case where the plurality of conductors 241 are connected to each other by the via conductor V21 provided inside the dielectric substrate 100 is described. The plurality of conductors 241 may be connected to each other outside the dielectric substrate 100.

Figure 11:
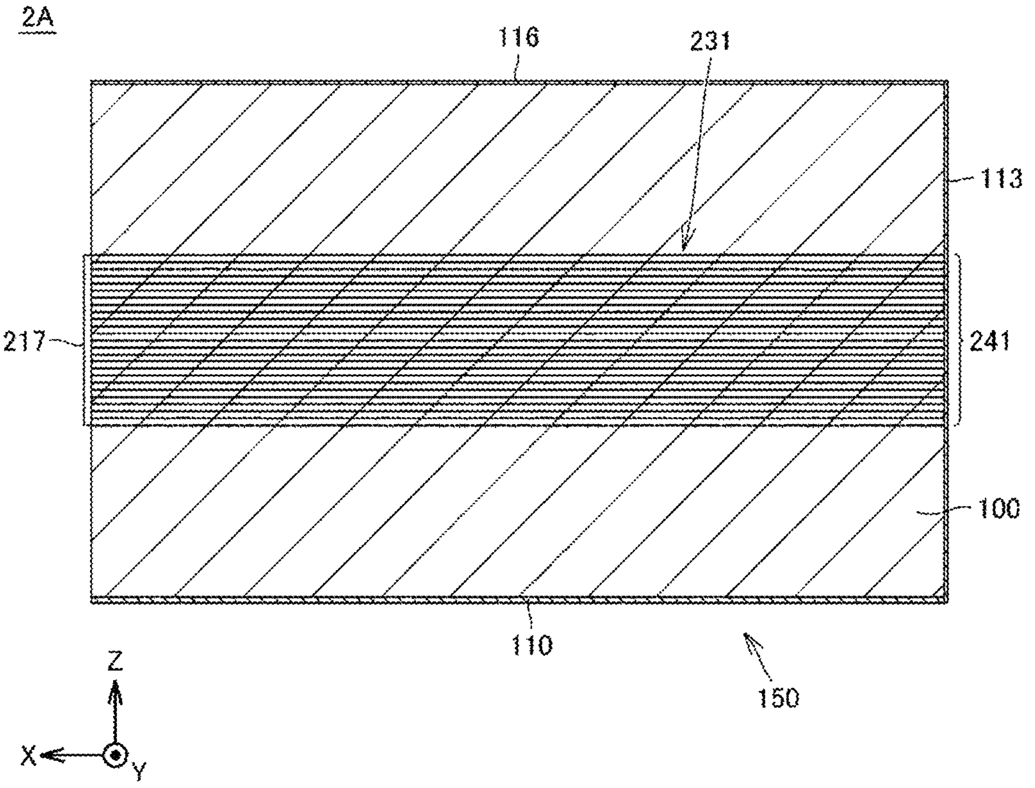
FIG. 11 is a sectional view of a dielectric resonator according to Modification 1 of Preferred Embodiment 2 of the present invention.

FIG. 11 is a sectional view of a dielectric resonator 2A according to Modification 1 of Preferred Embodiment 2. The dielectric resonator 2A has a configuration in which the via conductor V21 of FIG. 7 is replaced by a connection conductor 217 (short circuit conductor portion). The remaining configuration is the same or substantially the same as in Preferred Embodiment 2 so that the repetitive description thereof is omitted.

As illustrated in FIG. 11, the connection conductor 217 connects the plurality of conductors 241 to each other outside the dielectric substrate 100. The connection conductor 217 is provided outside the dielectric substrate 100 so that the process of forming via conductors inside the dielectric substrate 100 is unnecessary. As a result, the manufacturing process of the dielectric resonator 2 can be simplified.

With the dielectric resonator 2, the case where the X-axis direction length of each of the plurality of conductors 241 is equal or substantially equal to the X-axis direction length of the dielectric substrate 100 is described. The two may be different from each other.

Figure 12:
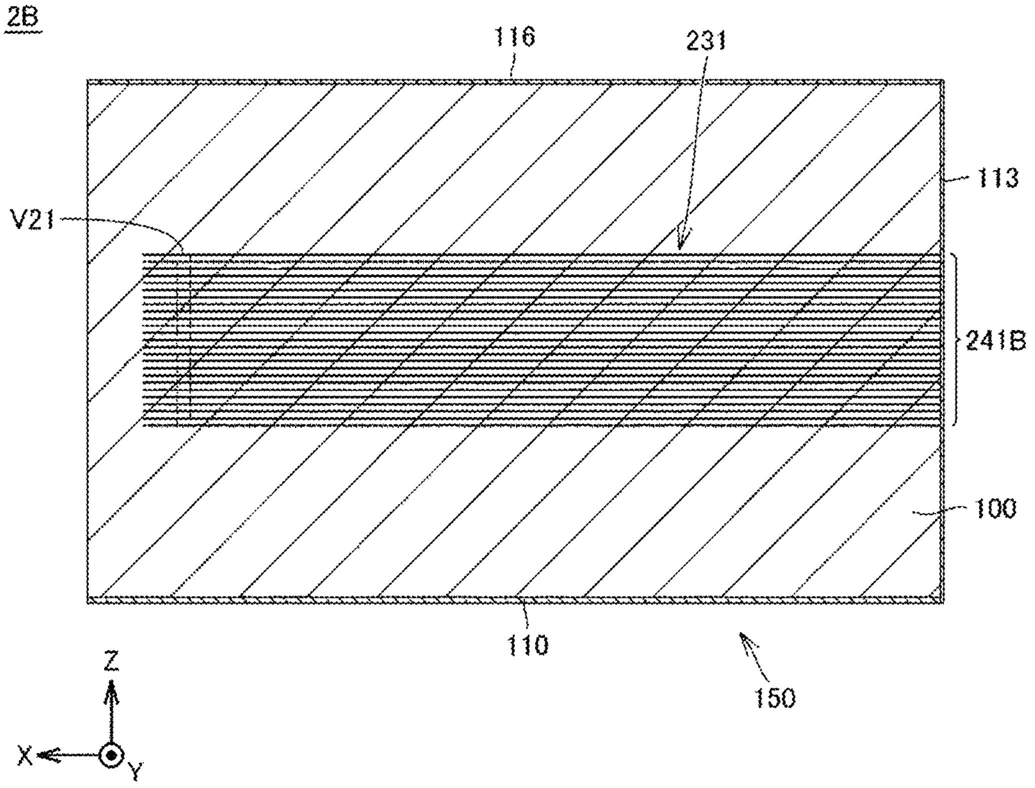
FIG. 12 is a sectional view of a dielectric resonator according to Modification 2 of Preferred Embodiment 2 of the present invention.

FIG. 12 is a sectional view of a dielectric resonator 2B according to Modification 2 of Preferred Embodiment 2. The dielectric resonator 2B has a configuration in which the plurality of conductors 241 of FIG. 7 are replaced by a plurality of conductors 241B. The remaining configuration is the same or substantially the same as in Preferred Embodiment 2 so that the repetitive description thereof is omitted. As illustrated in FIG. 12, the X-axis direction length of each of the plurality of conductors 241B is shorter than the X-axis direction length of the dielectric substrate 100.

With the dielectric resonator 2, the case where the one end of the distributed element 231 is the open end and the other end is the fixed end is described. The ends of the distributed element 231 may both be open ends.

Figure 13:
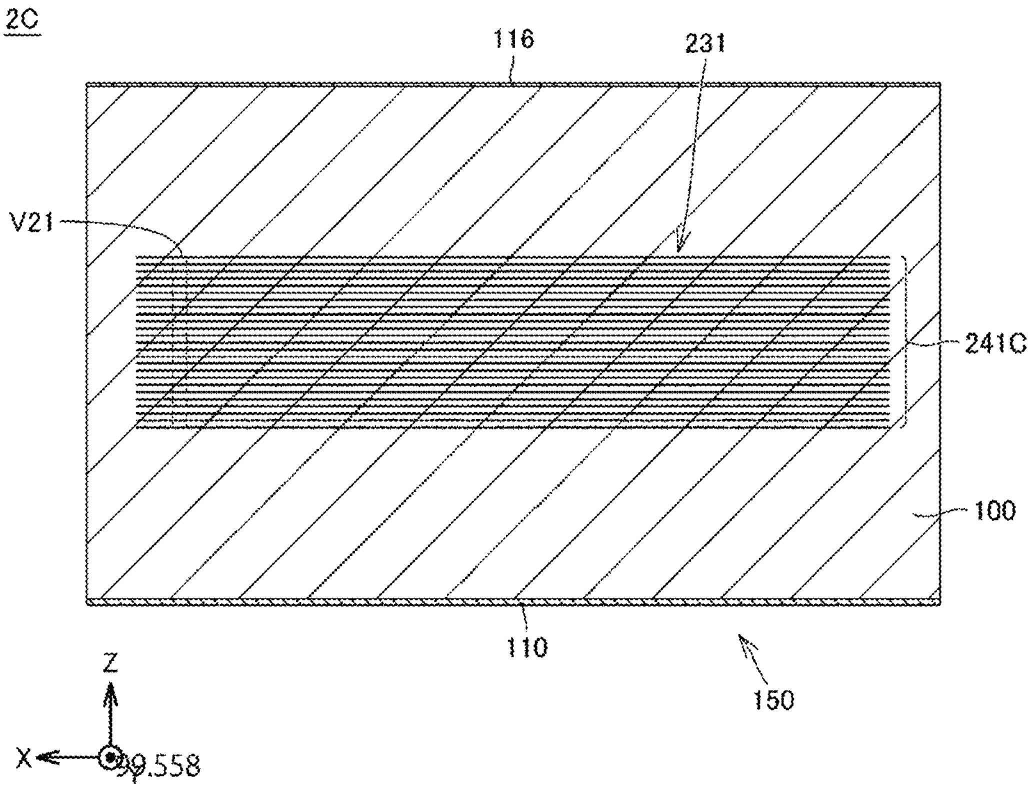
FIG. 13 is a sectional view of a dielectric resonator according to Modification 3 of Preferred Embodiment 2 of the present invention.

FIG. 13 is a sectional view of a dielectric resonator 2C according to Modification 3 of Preferred Embodiment 2. The dielectric resonator 2C has a configuration in which the plurality of conductors 241 of FIG. 7 are replaced by a plurality of conductors 241C and the shield electrode 113 is removed. The remaining configuration is the same or substantially the same as Preferred Embodiment 2 so that the repetitive description thereof is omitted. As illustrated in FIG. 13, the ends of each of the plurality of conductors 241C are both not connected to the shield conductor portion 150. That is, the ends of the distributed element 231 are both open ends. The X-axis direction length of the distributed element 231 is approximately one half of the wavelength of a signal that the dielectric resonator 2C resonates. That is, the dielectric resonator 2C is a λ/2 resonator.

With the dielectric resonator 2, the case where the plurality of conductors 241 are connected to each other at the open end of the distributed element 231 is described. The plurality of conductors 241 are not necessarily connected to each other at the open end of the distributed element 231.

Figure 14:
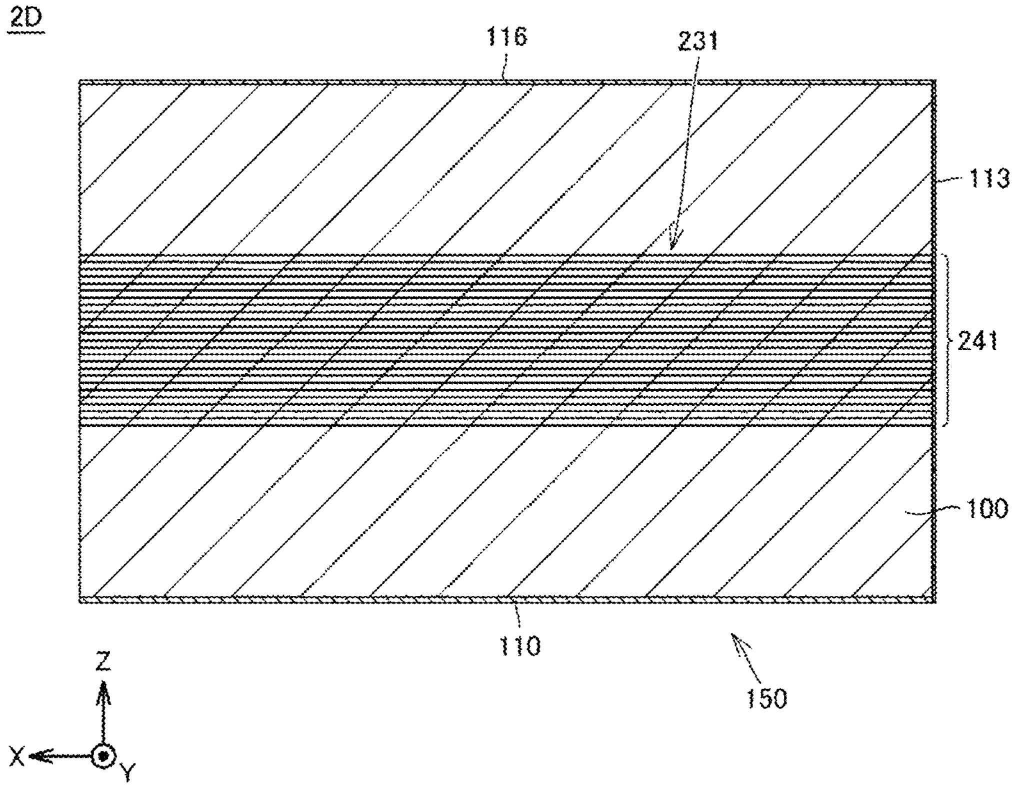
FIG. 14 is a sectional view of a dielectric resonator according to Modification 4 of Preferred Embodiment 2 of the present invention.

FIG. 14 is a sectional view of a dielectric resonator 2D according to Modification 4 of Preferred Embodiment 2. The dielectric resonator 2D has a configuration in which the via conductor V21 of FIG. 7 is removed. The remaining configuration is the same or substantially the same as Preferred Embodiment 2 so that the repetitive description thereof is omitted.

From the above, with the dielectric resonator according to one of Preferred Embodiment 2 and Modifications 1 to 4 of Preferred Embodiment 2, an improvement in Q factor can be achieved.

Preferred Embodiment 3

In Preferred Embodiment 2, the case where the distributed element includes the stacked plurality of conductors having the same or substantially the same linear shape is described. When the number of the plurality of stacked conductors is increased and the intervals between the conductors are reduced, the volume of a dielectric that can be provided between the conductors is reduced. As a result, the rigidity of the dielectric between the conductors is reduced so that the distributed element is likely to be distorted due to stress generated between the conductors and the dielectric. Thus, in Preferred Embodiment 3 of the present invention, a configuration in which no conductor multilayer structure is provided in the core portion of a distributed element is described. With this configuration, the rigidity of a dielectric provided in the core portion is ensured so that the distortion of the distributed element can be reduced while the Q factor of the dielectric resonator can be maintained.

Figure 15:
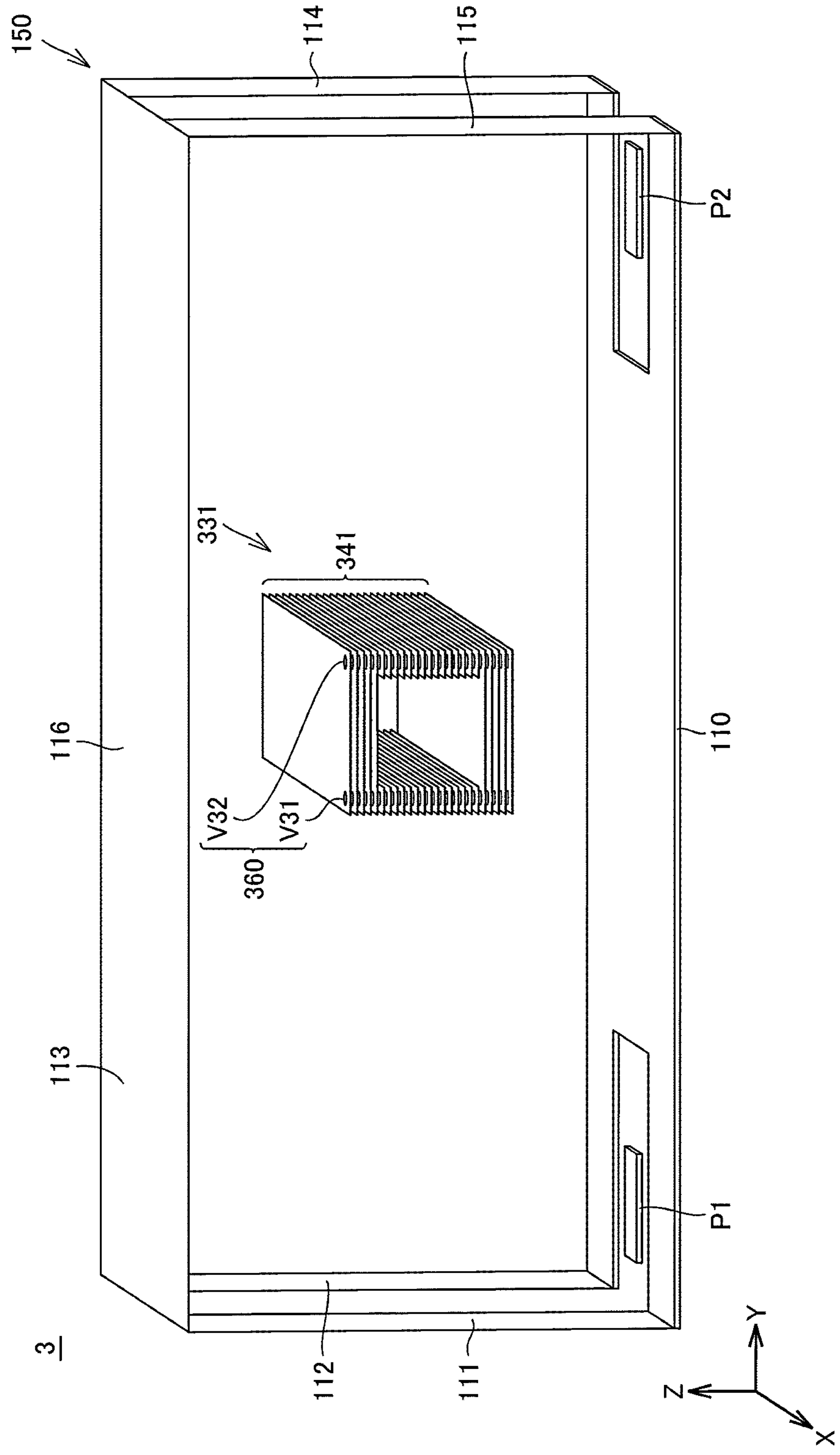
FIG. 15 is a perspective view of a dielectric resonator according to Preferred Embodiment 3 of the present invention.

FIG. 15 is a perspective view of a dielectric resonator 3 according to Preferred Embodiment 3. The dielectric resonator 3 has a configuration in which the distributed element 231 of FIG. 6 is replaced by a distributed element 331. The remaining configuration is the same or substantially the same as in Preferred Embodiment 2 so that the repetitive description thereof is omitted.

As illustrated in FIG. 15, the distributed element 331 includes a plurality of conductors 341 and a short circuit conductor portion 360 (short circuit conductor portion). The short circuit conductor portion 360 includes via conductors V31 and V32. The plurality of conductors 341 each define a distributed constant line that extends in the X-axis direction and has the Z-axis direction as the normal thereof.

One end of the distributed element 331 is not connected to the shield conductor portion 150. That is, the one end of the distributed element 331 is an open end that may have a variable voltage. At the one end of the distributed element 331, the plurality of conductors 341 are connected to each other by each of the via conductors V31 and V32.

The other end of the distributed element 331 is connected to the shield electrode 113. That is, the other end of the distributed element 331 is a fixed end at a voltage fixed to the reference voltage of the shield conductor portion 150.

The X-axis direction length of the distributed element 331 is approximately one fourth of the wavelength of a signal that the dielectric resonator 3 resonates. That is, the dielectric resonator 3 is a λ/4 resonator.

Figure 16:
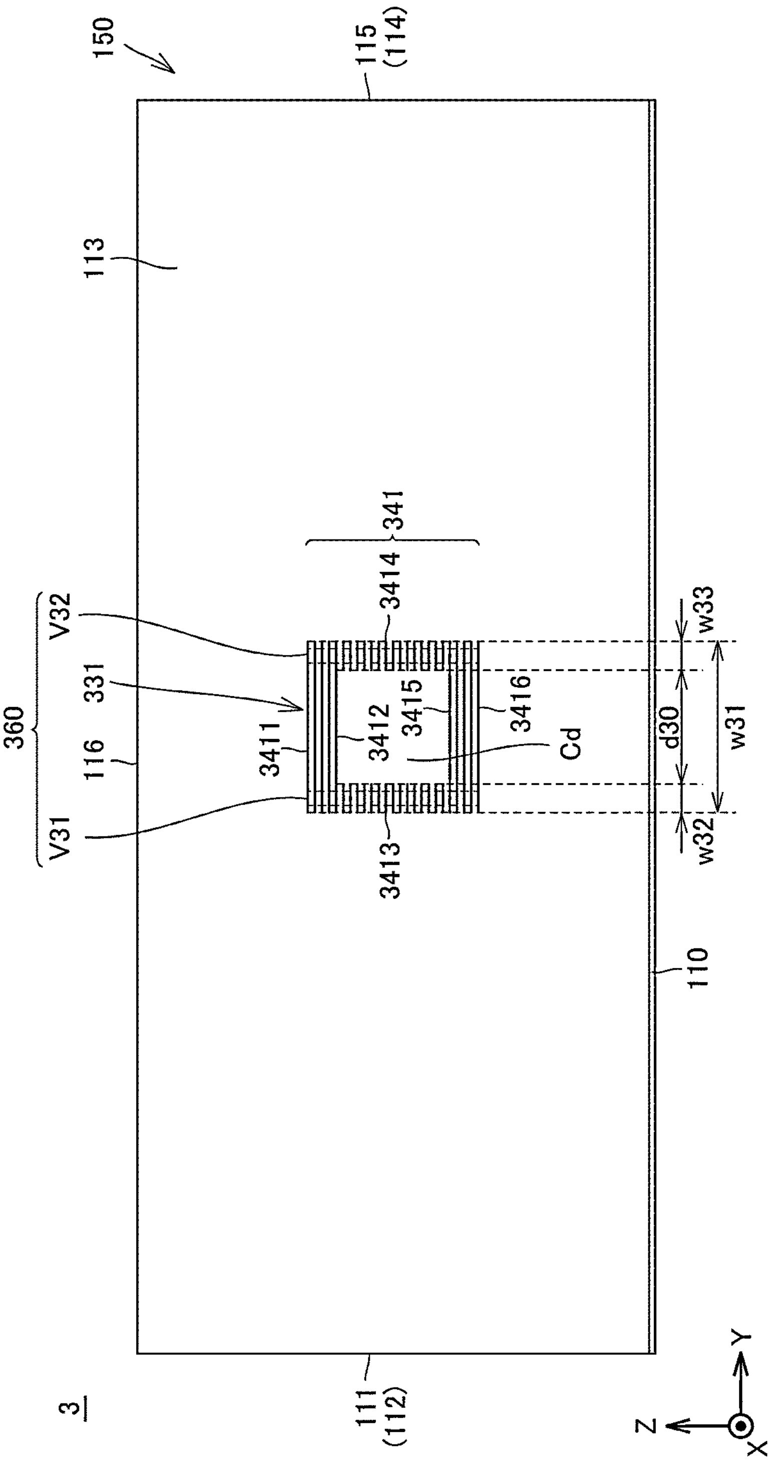
FIG. 16 is a plan view of the dielectric resonator of FIG. 15 when viewed from the X-axis direction.

FIG. 16 is a plan view of the dielectric resonator 3 of FIG. 15 when viewed from the X-axis direction. As illustrated in FIG. 16, the length of the distributed element 331 in the Y-axis direction (width) is a width w31 (specific length).

The plurality of conductors 341 include a conductor 3411 (first conductor), a conductor 3412 (first conductor), a conductor 3413 (third conductor), a conductor 3414 (fourth conductor), a conductor 3415 (second conductor), and a conductor 3416 (second conductor). Of the conductors of the plurality of conductors 341, the conductors other than the conductors 3411 and 3416 are stacked between the conductor 3411 and the conductor 3416.

The width of each of the conductors 3411, 3412, 3415, and 3416 is the width w31. The widths of the conductors stacked between the conductors 3411 and 3412 and the widths of the conductors stacked between the conductors 3415 and 3416 are also the width w31.

The width of the conductor 3413 is a width w32 (<w31). The width of the conductor 3414 is a width w33 (<w31). The widths w32 and w33 may be different from each other or equal or substantially equal to each other. The conductors 3413 and 3414 are provided between the conductors 3412 and 3415 in the Z-axis direction. The conductors 3413 and 3414 are separated from each other by a distance d30 (=w31−w32−w33) in the Y-axis direction.

The widths of the conductors stacked between the conductors 3412 and 3413 and the widths of the conductors stacked between the conductors 3413 and 3415 are each also the width w32. The conductor 3411, the conductors stacked between the conductors 3411 and 3413, the conductor 3413, the conductors stacked between the conductor 3413 and the conductor 3416, and the conductor 3416 are connected to each other by the via conductor V31.

The widths of the conductors stacked between the conductors 3412 and 3414 and the widths of the conductors stacked between the conductors 3414 and 3415 are each also the width w33. The conductor 3411, the conductors stacked between the conductors 3411 and 3414, the conductors stacked between the conductor 3414 and the conductor 3416, and the conductor 3416 are connected to each other by the via conductor V32.

In a core portion Cd of the distributed element 331 (the portion between the conductors 3412 and 3415 and between the conductors 3413 and 3414), no conductor multilayer structure is provided. The rigidity of the dielectric in the core portion Cd can be ensured so that the distortion of the distributed element 331 can be reduced. Further, due to the skin effect of high frequency signals, almost no current flows through the core portion of the distributed element 331. Thus, even when no conductor multilayer structure is provided in the core portion Cd, the amount of current that flows through the distributed element 331 is hardly reduced. As a result, the Q factor of the dielectric resonator 3 can be maintained.

Figure 17:
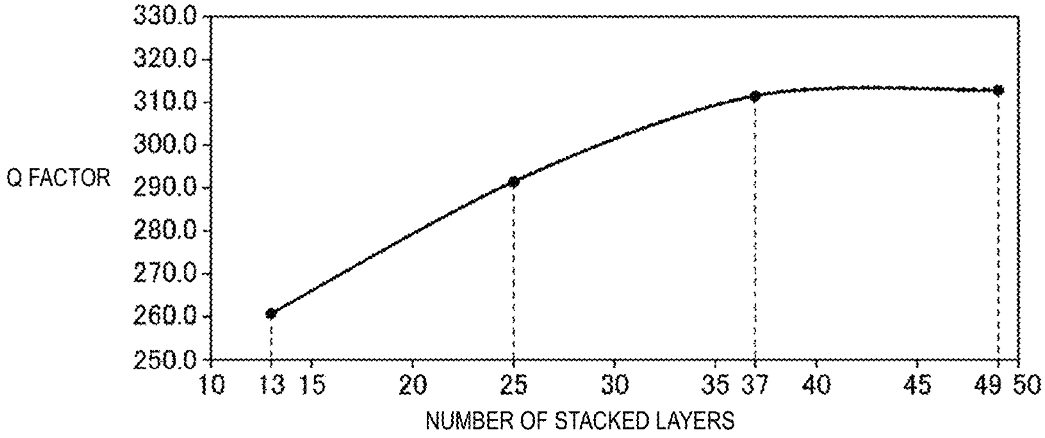
FIG. 17 is a diagram illustrating a case of the dielectric resonator of FIG. 16 (solid line) and the dielectric resonator of FIG. 6 (dotted line) in terms of the relationship between the number of the plurality of stacked conductors and the Q factor of the dielectric resonator.

FIG. 17 is a diagram illustrating the case of the dielectric resonator 3 of FIG. 16 (solid line) and the dielectric resonator 2 of FIG. 6 (dotted line) in terms of the relationship between the number of the plurality of stacked conductors and the Q factor of the dielectric resonator. As described in FIG. 17, the two are almost the same. Thus, in the dielectric resonator 3, the Q factor of the dielectric resonator 2 is maintained.

With the dielectric resonator 3, the case where the conductors having the same or substantially the same width as the outermost conductors 3411 and 3416 are provided between the core portion Cd and the outermost conductor 3411 or 3416 is described. However, no conductor may be provided between the core portion Cd and the outermost conductor 3411 or 3416.

Figure 18:
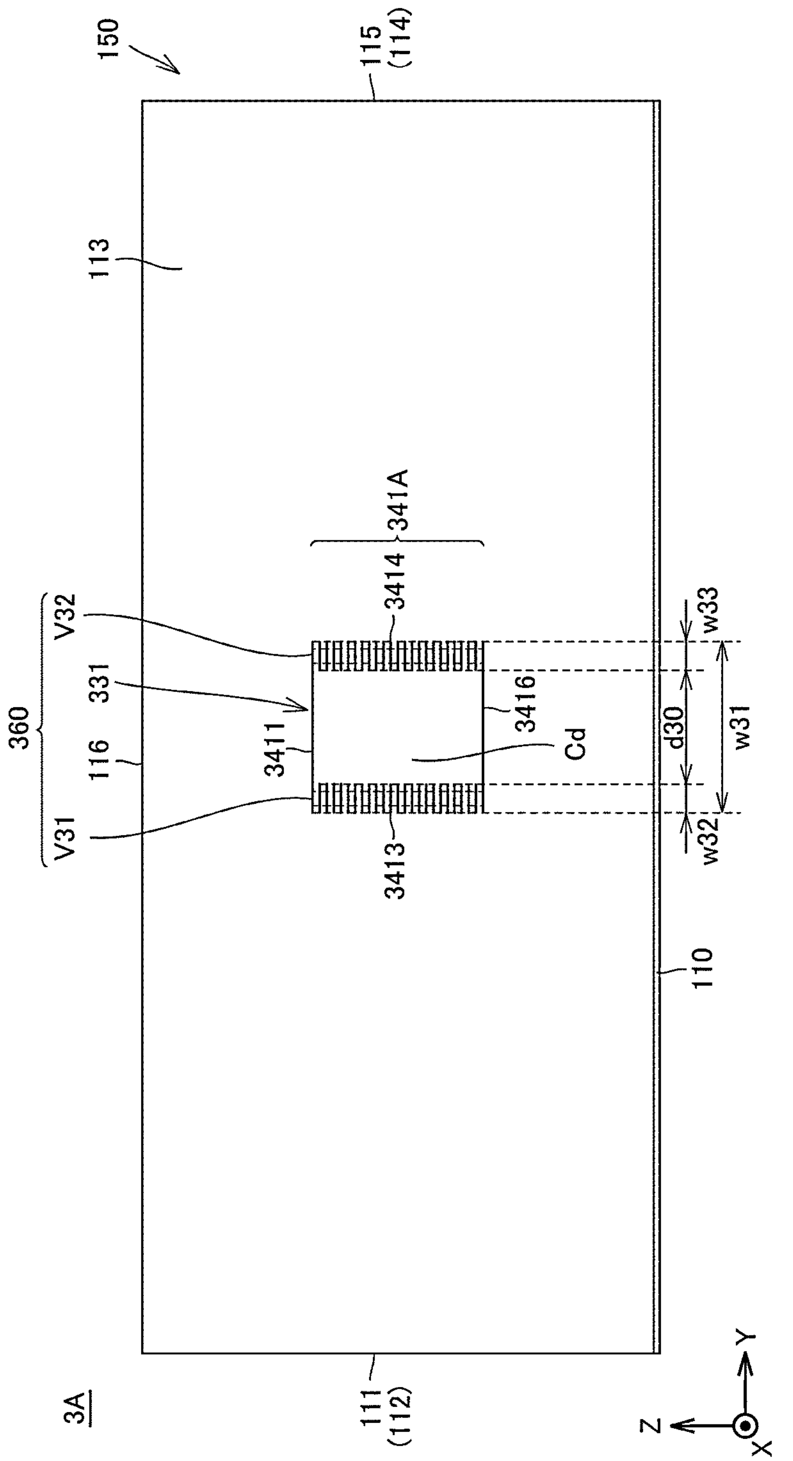
FIG. 18 is a plan view of a dielectric resonator according to a modification of Preferred Embodiment 3 of the present invention when viewed from the X-axis direction.

FIG. 18 is a plan view of a dielectric resonator 3A according to a modification of Preferred Embodiment 3 when viewed from the X-axis direction. The dielectric resonator 3A has a configuration in which the plurality of conductors 341 of FIG. 16 are replaced by a plurality of conductors 341A. Of the plurality of conductors 341A, between the outermost conductors 3411 and 3416, at the respective ends in the Y-axis direction of the core portion Cd, a conductor having the same or substantially the same width as the conductor 3413 and a conductor having the same or substantially the same width as the conductor 3414 are stacked. From the viewpoint of the skin effect, the thickness of each of the conductors 3411 and 3416 is preferably larger than the skin depth of each conductor.

From the above, with the dielectric resonator according to Preferred Embodiment 3 or the modification of Preferred Embodiment 3, an improvement in Q factor can be achieved and the distortion of the dielectric resonator can be reduced.

Preferred Embodiment 4

In Preferred Embodiment 4 of the present invention, a two-stage dielectric filter is described.

Figure 19:
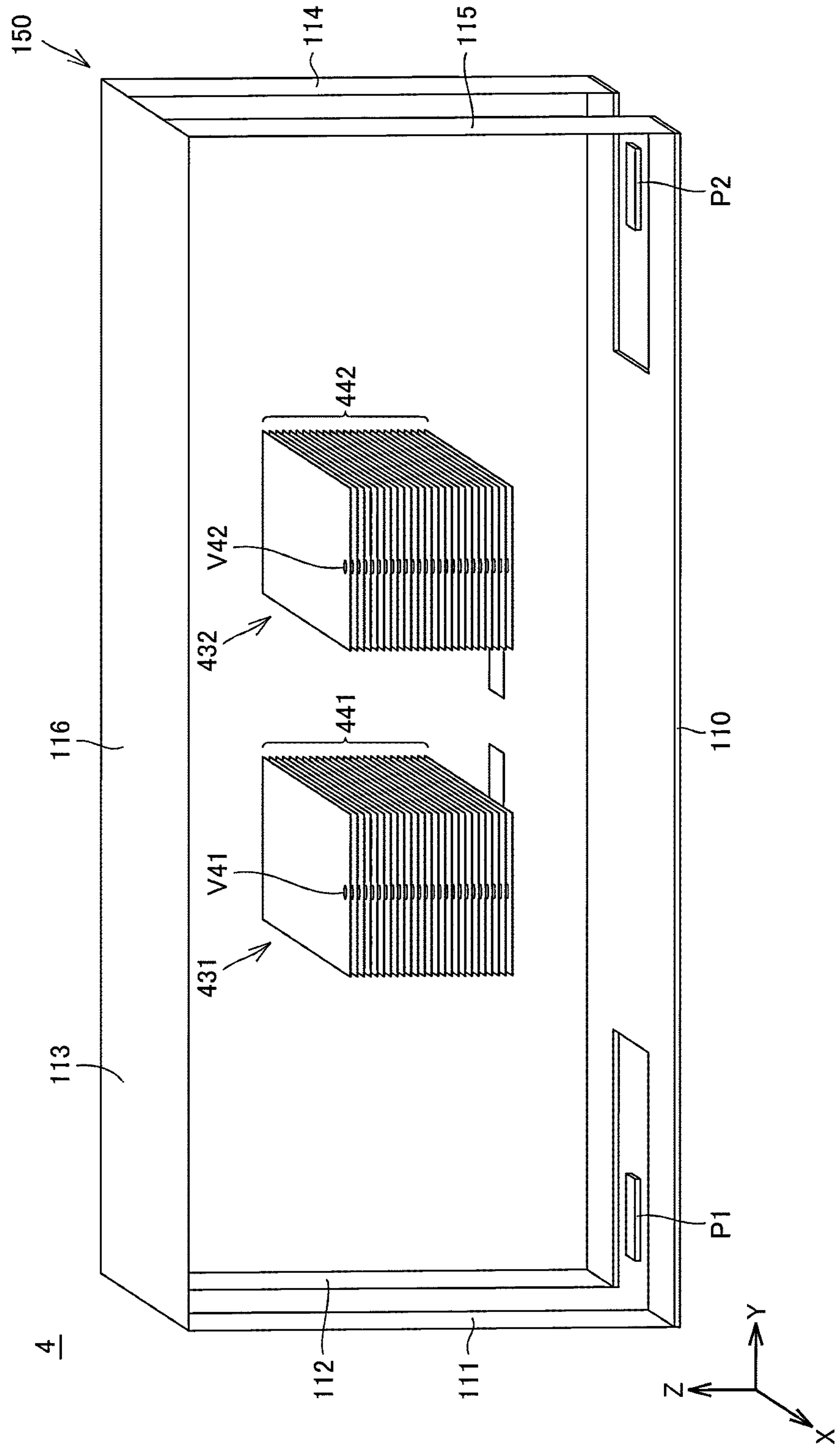
FIG. 19 is a perspective view of a dielectric filter according to Preferred Embodiment 4 of the present invention.

FIG. 19 is a perspective view of a dielectric filter 4 according to Preferred Embodiment 4. The dielectric filter 4 has a configuration in which the distributed elements 131 to 134 of the dielectric filter 1 of FIG. 2 are replaced by distributed elements 431 and 432. The remaining configuration is the same or substantially the same so that the repetitive description thereof is omitted.

As illustrated in FIG. 19, the distributed element 431 includes a plurality of conductors 441 and a via conductor V41 (short circuit conductor portion). The plurality of conductors 441 each define a distributed constant line that extends in the X-axis direction and has the Z-axis direction as the normal thereof.

One end of the distributed element 431 is not connected to the shield conductor portion 150. That is, the one end of the distributed element 431 is an open end that may have a variable voltage. At the one end of the distributed element 431, the plurality of conductors 441 are connected to each other by the via conductor V41.

The other end of the distributed element 431 is connected to the shield electrode 113. That is, the other end of the distributed element 431 is a fixed end at a voltage fixed to the reference voltage of the shield conductor portion 150.

The distributed element 432 includes a plurality of conductors 442 and a via conductor V42 (short circuit conductor portion). The plurality of conductors 442 each define a distributed constant line that extends in the X-axis direction and has the Z-axis direction as the normal thereof.

One end of the distributed element 432 is not connected to the shield conductor portion 150. That is, the one end of the distributed element 432 is an open end that may have a variable voltage. At the one end of the distributed element 432, the plurality of conductors 442 are connected to each other by the via conductor V42.

The other end of the distributed element 432 is connected to the shield electrode 113. That is, the other end of the distributed element 432 is a fixed end at a voltage fixed to the reference voltage of the shield conductor portion 150.

The X-axis direction length of each of the distributed elements 431 and 432 is approximately one fourth of the wavelength of a desired signal that can pass through the dielectric filter 4. That is, the distributed elements 431 and 432 are each a λ/4 resonator. The dielectric filter 4 is a two-stage dielectric filter including the two λ/4 resonators.

Figure 20:
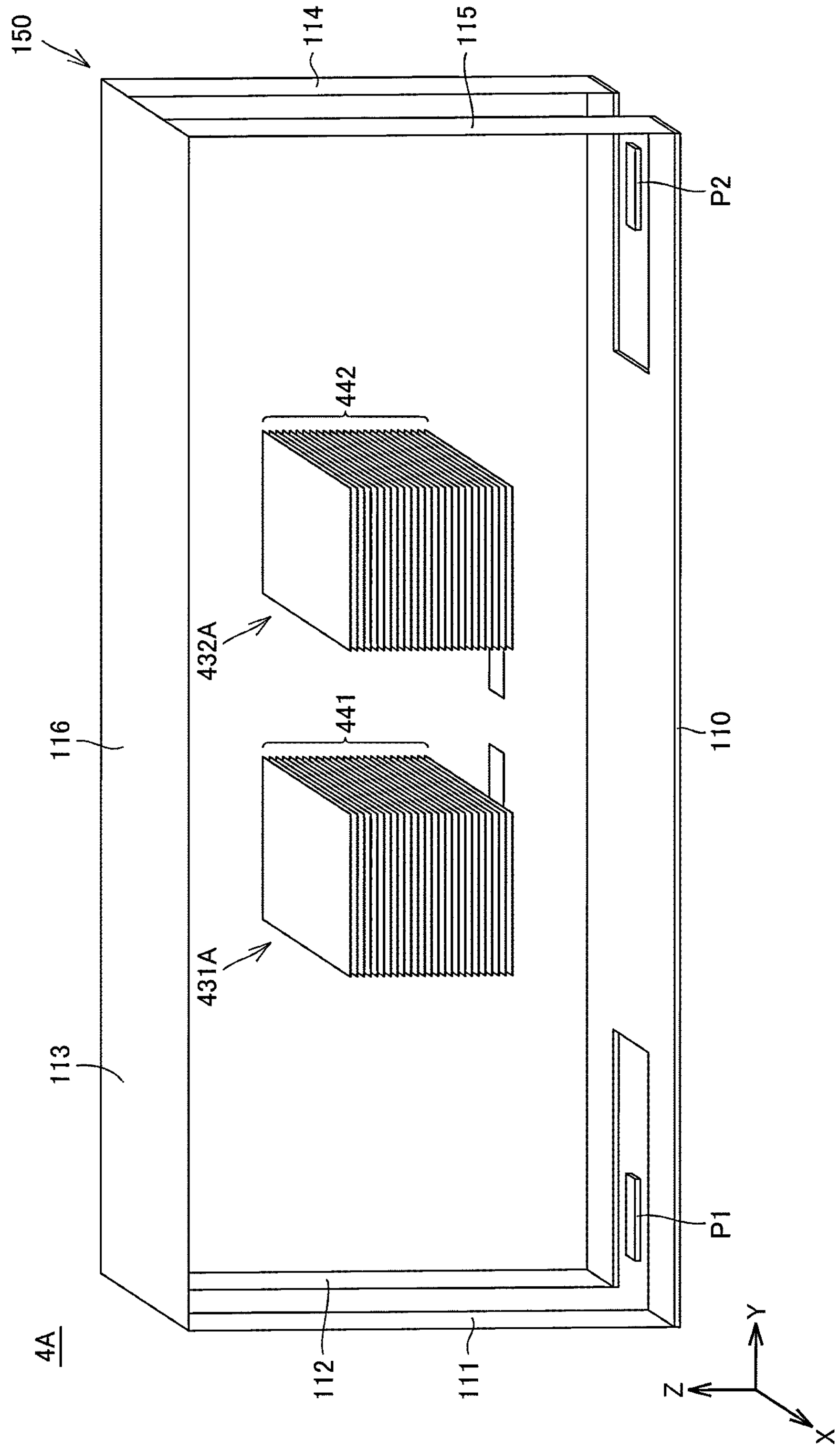
FIG. 20 is a perspective view of a dielectric filter according to a modification of Preferred Embodiment 4 of the present invention.

FIG. 20 is a perspective view of a dielectric filter 4A according to a modification of Preferred Embodiment 4. The dielectric filter 4A has a configuration in which the distributed elements 431 and 432 of FIG. 19 are replaced by distributed elements 431A and 432A, respectively. The distributed elements 431A and 432A each have the configuration of the distributed element 431 or 432 of FIG. 19 from which the via conductor V41 or V42 is removed. The remaining configuration is the same or substantially the same as in Preferred Embodiment 4 so that the repetitive description thereof is omitted.

Figure 21:
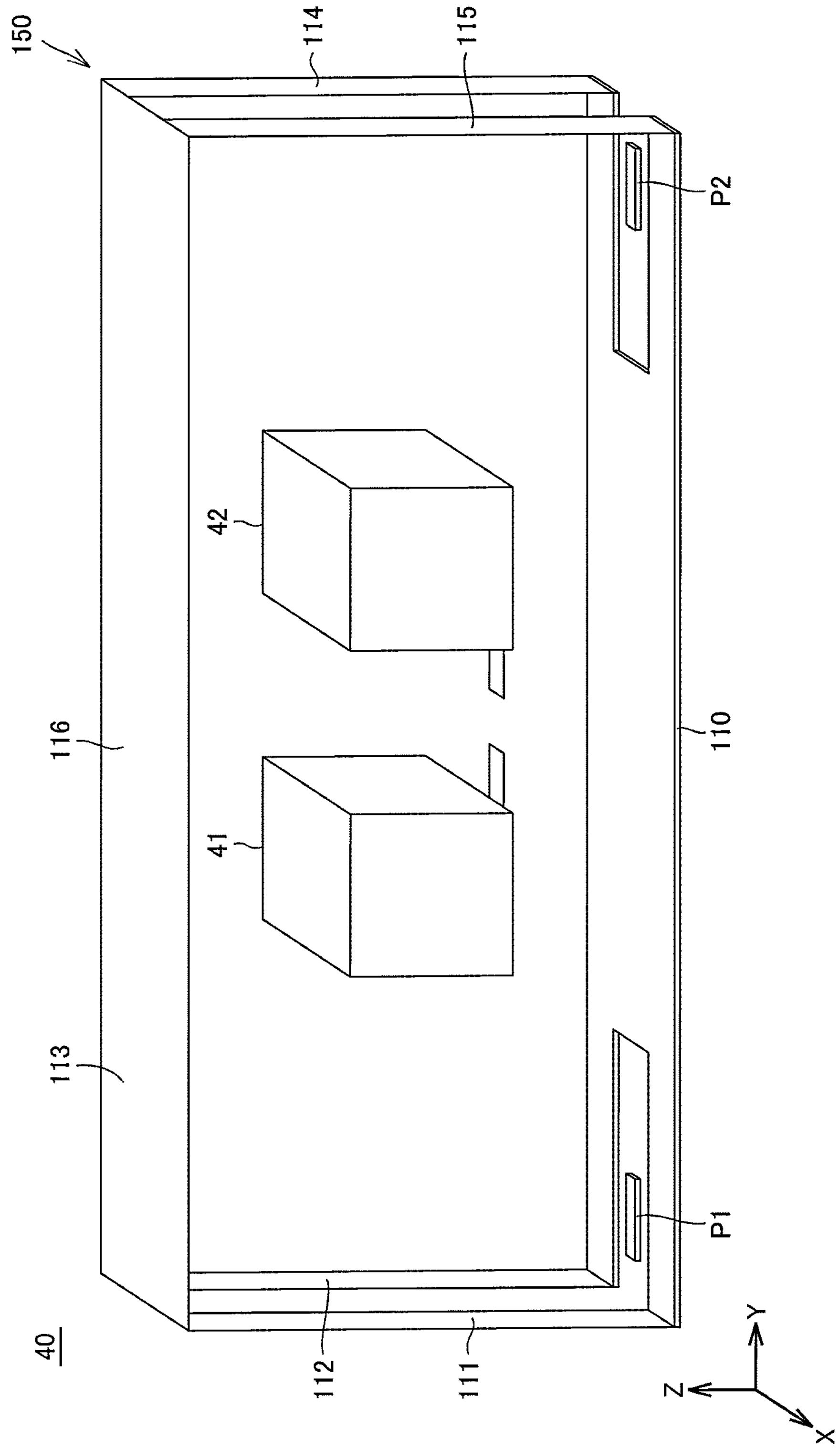
FIG. 21 is a perspective view of a dielectric filter according to Comparative Example 3.

FIG. 21 is a perspective view of a dielectric filter 40 according to Comparative Example 3. The dielectric filter 40 has a configuration in which the distributed elements 431 and 432 of FIG. 19 are replaced by distributed elements 41 and 42, respectively. The remaining configuration is the same or substantially the same as in Preferred Embodiment 4 so that the repetitive description thereof is omitted.

As illustrated in FIG. 21, the distributed elements 41 and 42 each include a single bulk material whose interior is filled. The X-axis direction length, Y-axis direction length, and Z-axis direction length of each of the distributed elements 41 and 42 are the same or substantially the same as the X-axis direction length, Y-axis direction length, and Z-axis direction length of each of the distributed elements 431 and 432 of FIG. 19, respectively.

Figure 22:
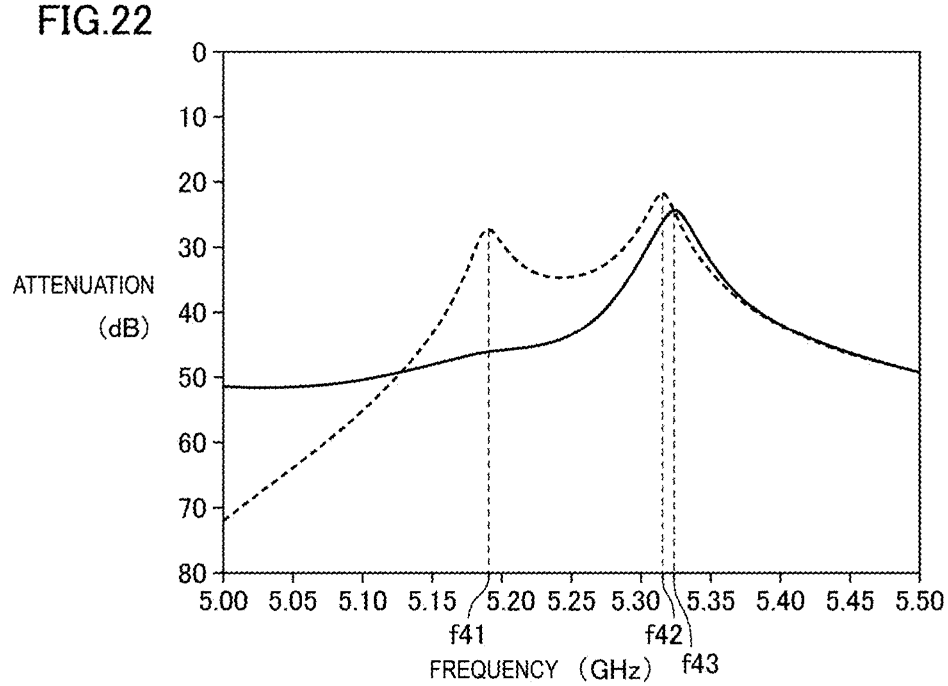
FIG. 22 is a diagram illustrating the bandpass characteristics of the dielectric filter of FIG. 20 (solid line) and the bandpass characteristics of the dielectric filter of FIG. 21 (dotted line).

FIG. 22 is a diagram illustrating the bandpass characteristics of the dielectric filter 4A of FIG. 20 (solid line) and the bandpass characteristics of the dielectric filter 40 of FIG. 21 (dotted line). As illustrated in FIG. 22, in the dielectric filter 40, the insertion loss is minimum at frequencies f41 and f42 (>f41). The frequency f41 is the resonant frequency of the dielectric filter 40 in an odd mode in which currents flow through the respective distributed elements 41 and 42 in the opposite directions. The frequency f42 is the resonant frequency of the dielectric filter 40 in an even mode in which currents flow through the respective distributed elements 41 and 42 in the same direction. The insertion loss is minimum at the frequencies f41 and f42 so that the pass band of the dielectric filter 40 is provided between the frequencies f41 and f42.

In the dielectric filter 4A, the insertion loss is minimum at a frequency f43 (>f41). In the dielectric filter 4A, resonance occurs in the even mode in which currents flow through the respective distributed elements 431A and 432A in the same direction. However, resonance is difficult to occur in the odd mode in which currents flow through the respective distributed elements 431A and 432A in the opposite directions.

In the dielectric filter 4A, the pluralities of conductors 441 and 442 are each not connected to each other at the open end of the distributed element 431A or 432A so that currents flow through the plurality of respective conductors in a plurality of resonant modes, and the plurality of resonant modes interfere with each other. In particular, in the odd mode, since currents flow through the respective distributed elements 431A and 432A in the opposite directions, the plurality of resonant modes cancel each other out. Thus, it is difficult for the dielectric filter 4A to resonate in the odd mode.

Figure 23:
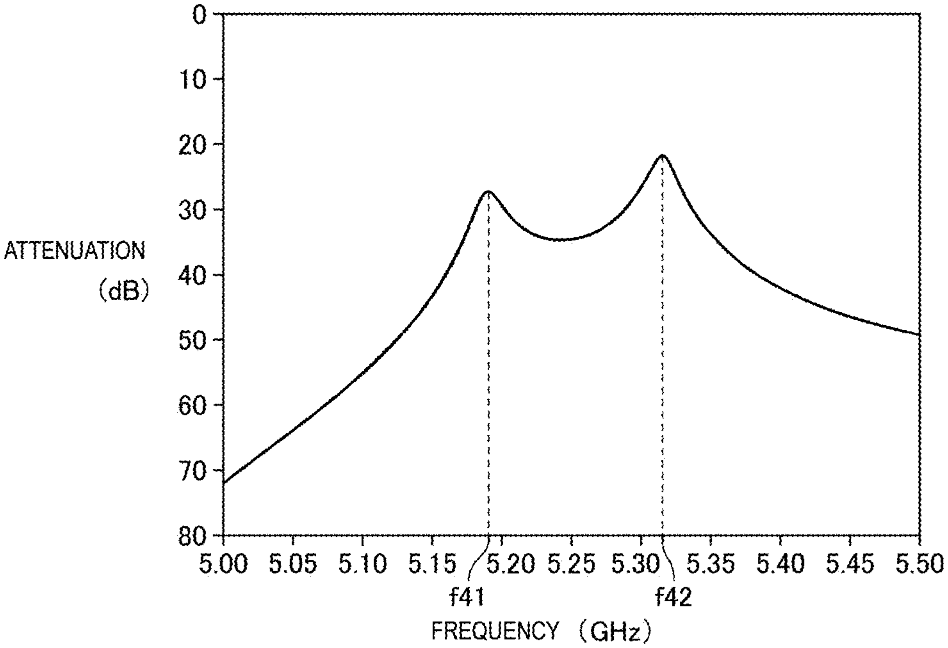
FIG. 23 is a diagram illustrating the bandpass characteristics of the dielectric filter of FIG. 19 (solid line) and the bandpass characteristics of the dielectric filter of FIG. 21 (dotted line).

FIG. 23 is a diagram illustrating the bandpass characteristics of the dielectric filter 4 of FIG. 19 (solid line) and the bandpass characteristics of the dielectric filter 40 of FIG. 21 (dotted line). As illustrated in FIG. 23, the two indicate almost the same characteristics. Also in the dielectric filter 4, like the dielectric filter 40, the insertion loss is minimum at the frequencies f41 and f42 (>f41).

In the dielectric filter 4, the pluralities of conductors 441 and 442 are each connected to each other at the open end of the distributed element 431 or 432 so that the resonant modes of currents flowing through the plurality of respective conductors are matched with each other. As a result, also in the odd mode in which currents flow through the distributed elements 431 and 432 in the opposite directions, resonance occurs in the dielectric filter 4.

From the above, with the dielectric filter according to Preferred Embodiment 4 or the modification of Preferred Embodiment 4, a reduction in loss can be achieved. Moreover, with the dielectric filter according to Preferred Embodiment 4 or the modification of Preferred Embodiment 4, resonance can occur also in the odd mode so that the pass band can be widened.

Preferred Embodiment 5

In Preferred Embodiment 4, the case where the widths of the plurality of conductors of the distributed element are the same or substantially the same is described. When the plurality of conductors are viewed from the extending direction of the distributed element in plan view, the plurality of conductors form a rectangle or an approximate rectangle as a whole. When a current flows through a distributed element with sharp corner portions, such as a rectangular or substantially rectangular distributed element, the electric field is likely to be concentrated in the corner portions. The electric field concentration causes conductor loss, thus deteriorating the insertion loss of the dielectric filter.

Thus, in Preferred Embodiment 5 of the present invention, with regard to the plurality of conductors of a distributed element, the width of the conductor near the outermost layer is shorter than the width of the conductor near the middle layer. When the plurality of conductors are viewed from the extending direction of the distributed element in plan view, the plurality of conductors form a rectangle or an approximate rectangle with rounded corner portions as a whole. In this shape, since the corner portions are not sharp, the electric field concentration is reduced. With the dielectric filter according to Preferred Embodiment 5, the conductor loss is reduced. As a result, the insertion loss can be further improved.

Figure 24:
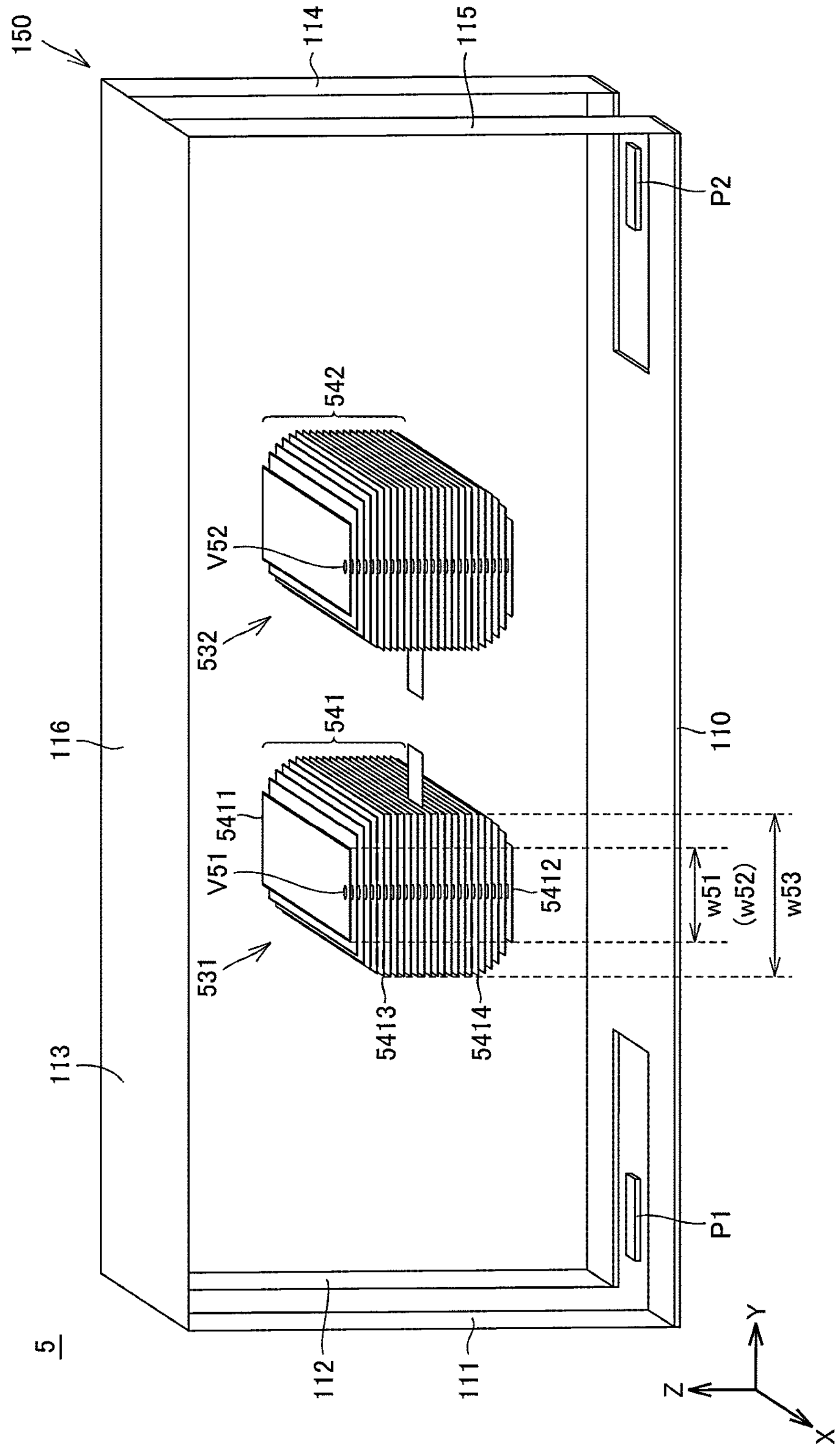
FIG. 24 is a perspective view of a dielectric filter according to Preferred Embodiment 5 of the present invention.

FIG. 24 is a perspective view of a dielectric filter 5 according to Preferred Embodiment 5. The dielectric filter 5 has a configuration in which the distributed elements 431 and 432 of FIG. 19 are replaced by distributed elements 531 and 532, respectively. The remaining configuration is the same or substantially the same as in Preferred Embodiment 4 so that the repetitive description thereof is omitted.

As illustrated in FIG. 24, the distributed element 531 includes a plurality of conductors 541 and a via conductor V51 (short circuit conductor portion). The plurality of conductors 541 each define a distributed constant line that extends in the X-axis direction and has the Z-axis direction as the normal thereof.

One end of the distributed element 531 is not connected to the shield conductor portion 150. That is, the one end of the distributed element 531 is an open end that may have a variable voltage. At the one end of the distributed element 531, the plurality of conductors 541 are connected to each other by the via conductor V51.

The other end of the distributed element 531 is connected to the shield electrode 113. That is, the other end of the distributed element 531 is a fixed end at a voltage fixed to the reference voltage of the shield conductor portion 150.

The distributed element 532 includes a plurality of conductors 542 and a via conductor V52 (short circuit conductor portion). The plurality of conductors 542 each define a distributed constant line that extends in the X-axis direction and has the Z-axis direction as the normal thereof.

One end of the distributed element 532 is not connected to the shield conductor portion 150. That is, the one end of the distributed element 532 is an open end that may have a variable voltage. At the one end of the distributed element 532, the plurality of conductors 542 are connected to each other by the via conductor V52.

The other end of the distributed element 532 is connected to the shield electrode 113. That is, the other end of the distributed element 532 is a fixed end at a voltage fixed to the reference voltage of the shield conductor portion 150.

The X-axis direction length of each of the distributed elements 531 and 532 is approximately one fourth of the wavelength of a desired signal that can pass through the dielectric filter 5. That is, the distributed elements 531 and 532 are each a $\lambda/4$ resonator. The dielectric filter 5 is a two-stage dielectric filter including the two $\lambda/4$ resonators.

The pluralities of conductors 541 and 542 have multilayer structures the same as or similar to each other. In the following, the multilayer structure of the plurality of conductors 541 is described.

The plurality of conductors 541 include a conductor 5411 (first conductor), a conductor 5412 (second conductor), a conductor 5413 (third conductor), and a conductor 5414

(third conductor). Of the conductors of the plurality of conductors 541, the conductors other than the conductors 5411 and 5412 are stacked between the conductor 5411 and the conductor 5412.

The width of the distributed element 531 is a width w53 (specific length). The widths of the conductors 5413 and 5414 and the conductors stacked between the conductors 5413 and 5414 are each also the width w53.

The width of the conductor 5411 is a width w51 (<w53). The width of the conductor 5412 is a width w52 (<w53). The widths w51 and w52 may be different from each other or equal to each other.

The widths of the conductors between the conductor 5411 and the conductor 5413 are gradually increased from the conductor 5411 to the conductor 5413. The widths of the conductors between the conductor 5412 and the conductor 5414 are gradually increased from the conductor 5412 to the conductor 5414.

Figure 25:
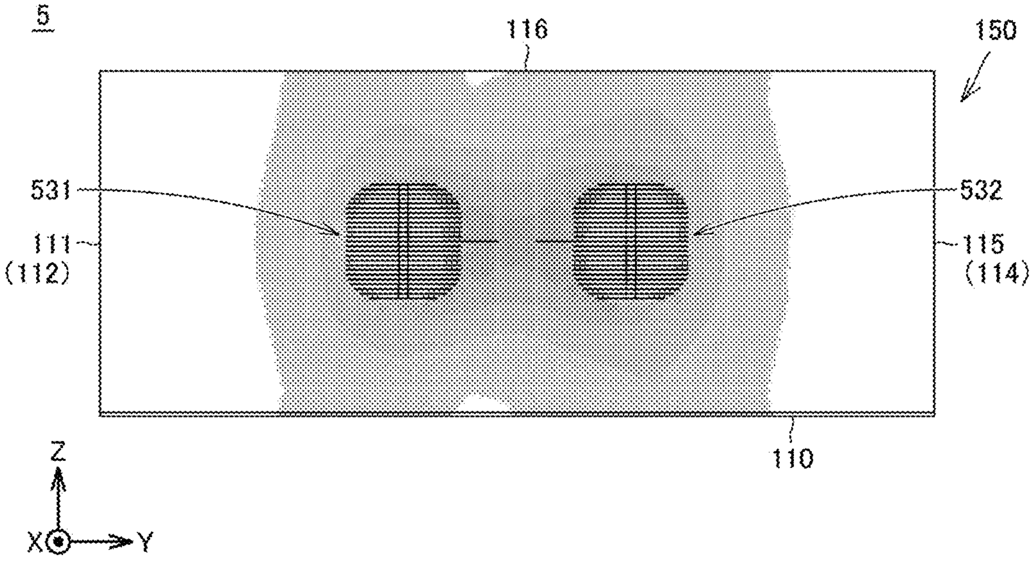
FIG. 25 is a plan view of the distribution of field strengths in a simulation in which a high frequency signal is passed through distributed elements of FIG. 24 in an odd mode when viewed from the X-axis direction.
Figure 26:
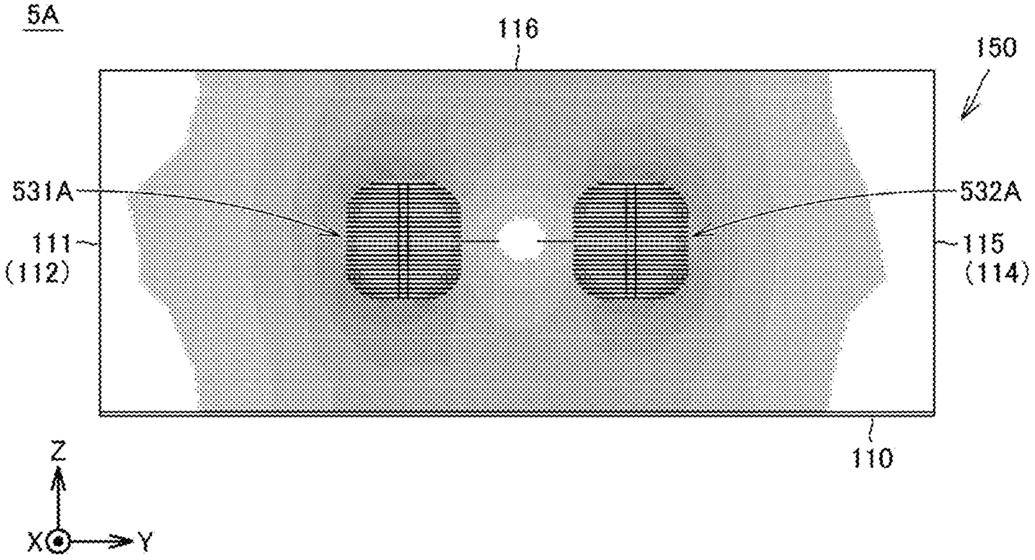
FIG. 26 is a plan view of the distribution of field strengths in a simulation in which a high frequency signal is passed through the distributed elements of FIG. 24 in an even mode when viewed from the X-axis direction.

FIG. 25 is a plan view of the distribution of field strengths in a simulation in which a high frequency signal is passed through the distributed elements 531 and 532 of FIG. 24 in an odd mode when viewed from the X-axis direction. FIG. 26 is a plan view of the distribution of field strengths in a simulation in which a high frequency signal is passed through the distributed elements 531 and 532 of FIG. 24 in an even mode when viewed from the X-axis direction. As illustrated in FIG. 25 and FIG. 26, the plurality of conductors of each of the distributed elements 531 and 532 form a rectangle or an approximate rectangle with rounded corner portions as a whole.

Figure 27:
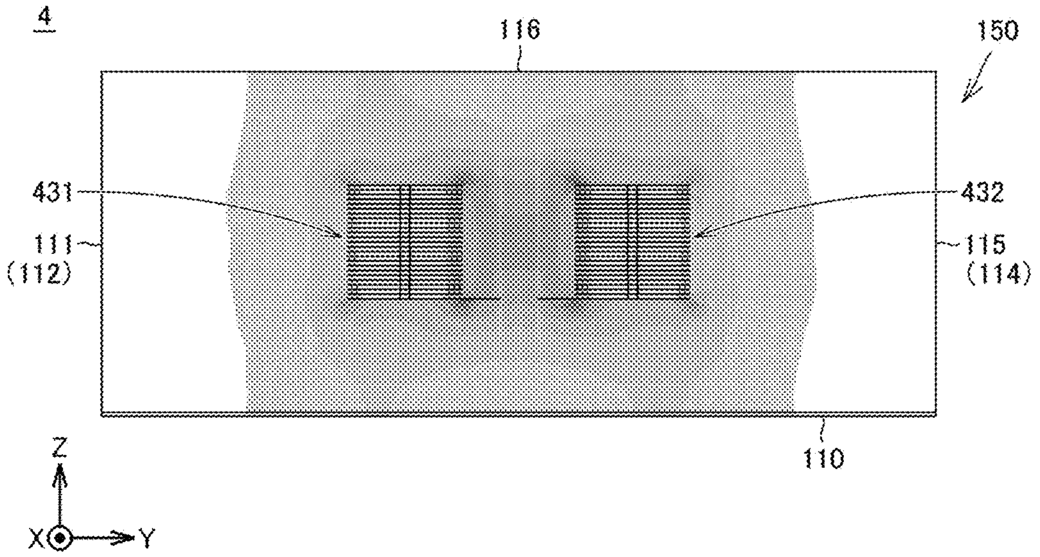
FIG. 27 is a plan view of the distribution of field strengths in a simulation in which a high frequency signal is passed through distributed elements of FIG. 19 in an odd mode when viewed from the X-axis direction.
Figure 28:
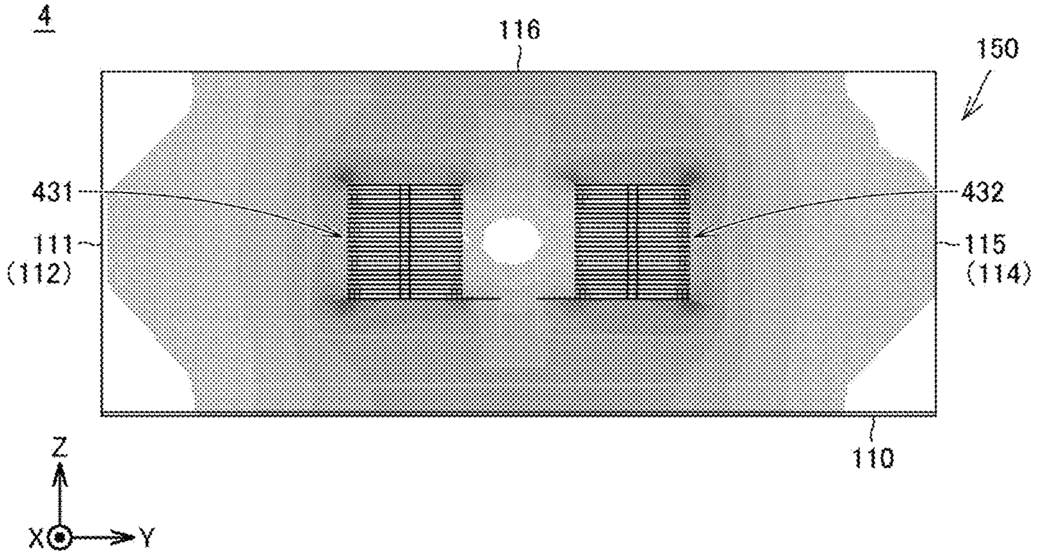
FIG. 28 is a plan view of the distribution of field strengths in a simulation in which a high frequency signal is passed through the distributed elements of FIG. 19 in an even mode when viewed from the X-axis direction.

FIG. 27 is a plan view of the distribution of field strengths in a simulation in which a high frequency signal is passed through the distributed elements 431 and 432 of FIG. 19 in an odd mode when viewed from the X-axis direction. FIG. 28 is a plan view of the distribution of field strengths in a simulation in which a high frequency signal is passed through the distributed elements 431 and 432 of FIG. 19 in an even mode when viewed from the X-axis direction. As illustrated in FIG. 27 and FIG. 28, the plurality of conductors of each of the distributed elements 431 and 432 form a rectangle or an approximate rectangle with sharp corner portions as a whole.

FIG. 25 and FIG. 27 are compared to each other in terms of the odd mode and FIG. 26 and FIG. 28 are compared to each other in terms of the even mode. The electric field that is concentrated at each end of the outermost conductors of each of the distributed elements 431 and 432 in FIG. 27 and FIG. 28 is distributed on the outermost conductors of the distributed elements 531 and 532 of FIG. 25 and FIG. 26. With the dielectric filter 5, the electric field concentration is reduced so that the insertion loss can be improved over the dielectric filter 4.

The shape that the plurality of conductors of the distributed constant line may be, for example, circular or substantially circular as a whole may be a circle. Note that the circular shape is not necessarily a perfect circular shape and includes an elliptical or substantially elliptical shape.

Figure 29:
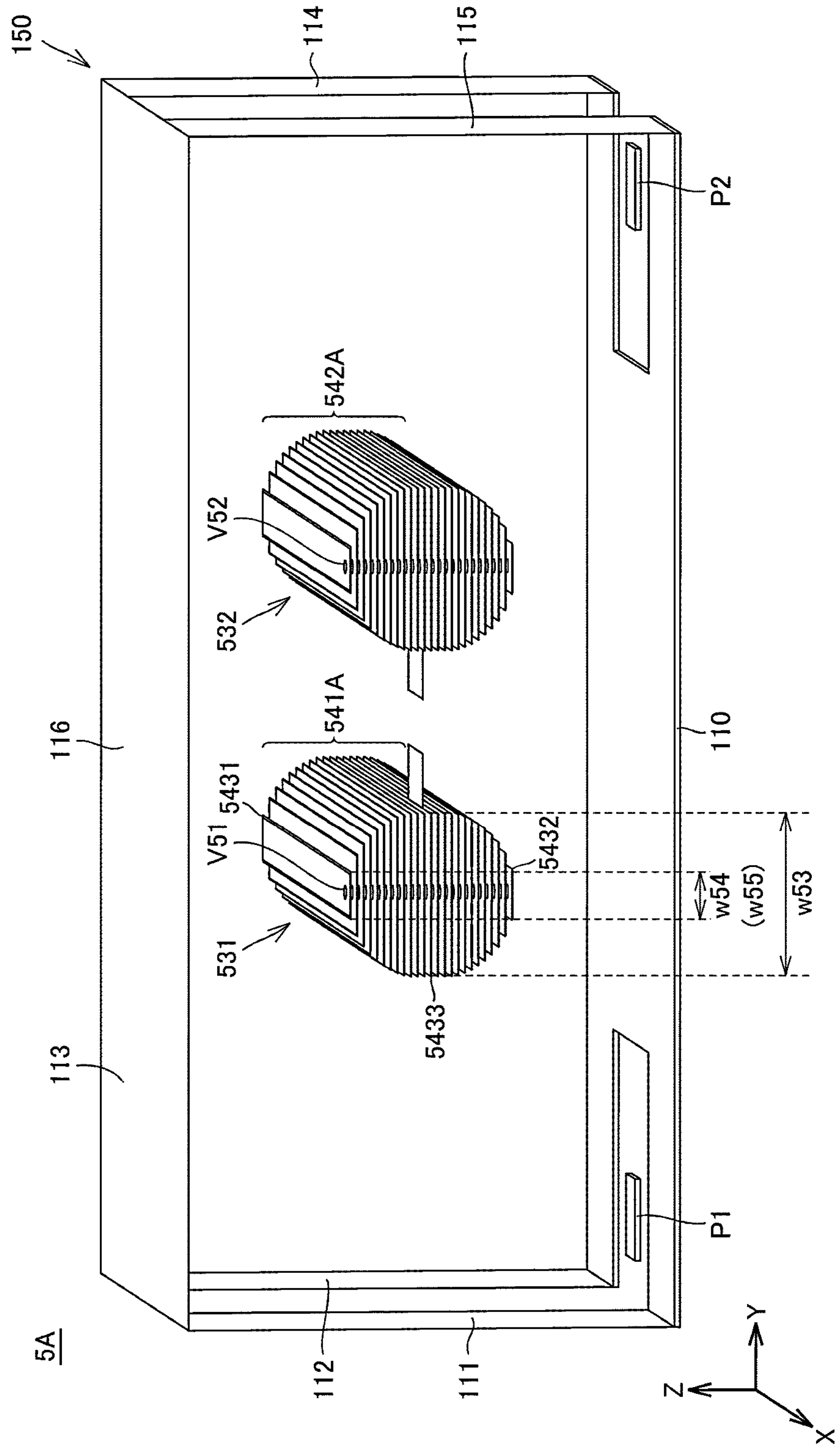
FIG. 29 is a perspective view of a dielectric filter according to a modification of Preferred Embodiment 5 of the present invention.

FIG. 29 is a perspective view of a dielectric filter 5A according to a modification of Preferred Embodiment 5. The dielectric filter 5A has a configuration in which the pluralities of conductors 541 and 542 of FIG. 24 are replaced by pluralities of conductors 541A and 542A. The remaining configuration is the same as or substantially the same as in Preferred Embodiment 5 so that the repetitive description thereof is omitted.

As illustrated in FIG. 29, when the pluralities of conductors 541A and 542A are viewed from the X-axis direction in plan view, the pluralities of conductors 541A and 542A each form a circle or an approximate circle as a whole.

The plurality of conductors 541A include a conductor 5431 (first conductor), a conductor 5432 (second conductor), and a conductor 5433 (third conductor). Of the conductors of the plurality of conductors 541A, the conductors other than the conductors 5431 and 5432 are stacked between the conductor 5431 and the conductor 5432.

The width of the conductor 5433 is a width w53. The width of the conductor 5431 is a width w54 (<w53). The width of the conductor 5432 is a width w55 (<w53). The widths w54 and w55 may be different from each other or equal or substantially equal to each other.

The widths of the conductors between the conductor 5431 and the conductor 5433 are gradually increased from the conductor 5431 to the conductor 5433. The widths of the conductors between the conductor 5432 and the conductor 5433 are gradually increased from the conductor 5432 to the conductor 5433.

Note that a dielectric resonator can be provided using the distributed element 531 of FIG. 24 and FIG. 29.

From the above, with the dielectric filter according to Preferred Embodiment 5 or the modification of Preferred Embodiment 5, a further reduction in loss can be achieved.

Preferred Embodiment 6

In Preferred Embodiment 6 of the present invention, a multiplexer including a dielectric filter according to one of the preferred embodiments or modifications thereof described above is described.

Figure 30:
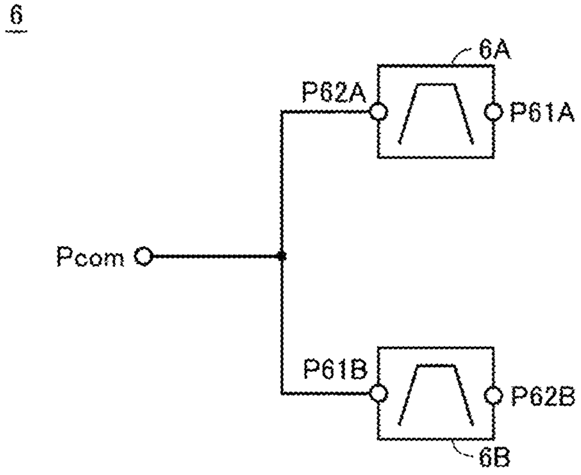
FIG. 30 is an equivalent circuit diagram of a duplexer that is an example of a multiplexer according to Preferred Embodiment 6 of the present invention.

FIG. 30 is an equivalent circuit diagram of a duplexer that is an example of a multiplexer according to Preferred Embodiment 6. As illustrated in FIG. 30, the duplexer 6 includes dielectric filters 6A and 6B and a common terminal Pcom. The dielectric filter 6A includes an input/output terminal P61A (first terminal) and an input/output terminal P62A (second terminal). The dielectric filter 6B includes an input/output terminal P61B (first terminal) and an input/output terminal P62B (second terminal). The common terminal Pcom is connected to the input/output terminal P62A of the dielectric filter 6A and the input/output terminal P61B of the dielectric filter 6B. The pass band of the dielectric filter 6A is different from the pass band of the dielectric filter 6B.

Figure 31:
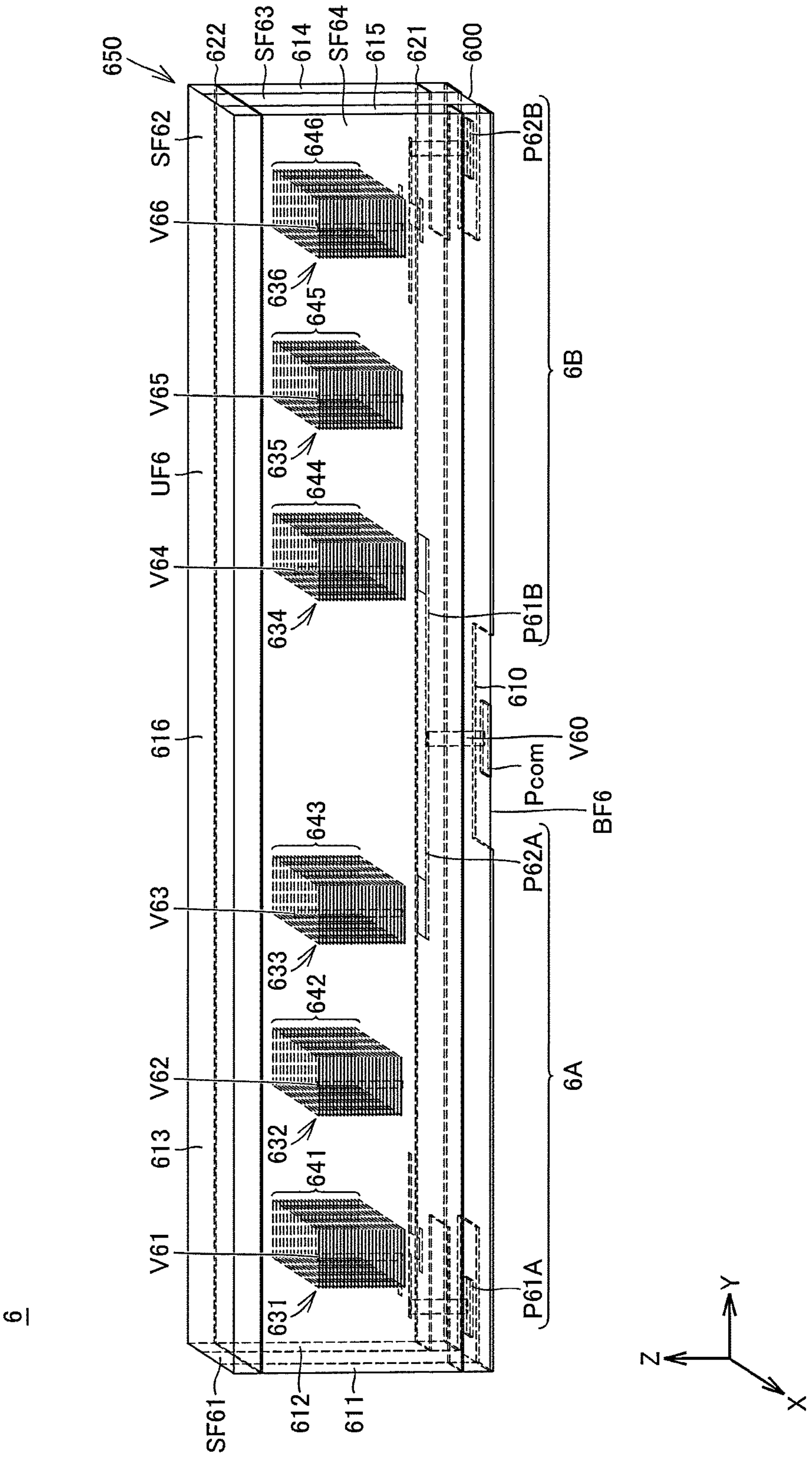
FIG. 31 is an external perspective view of the duplexer of FIG. 30.
Figure 32:
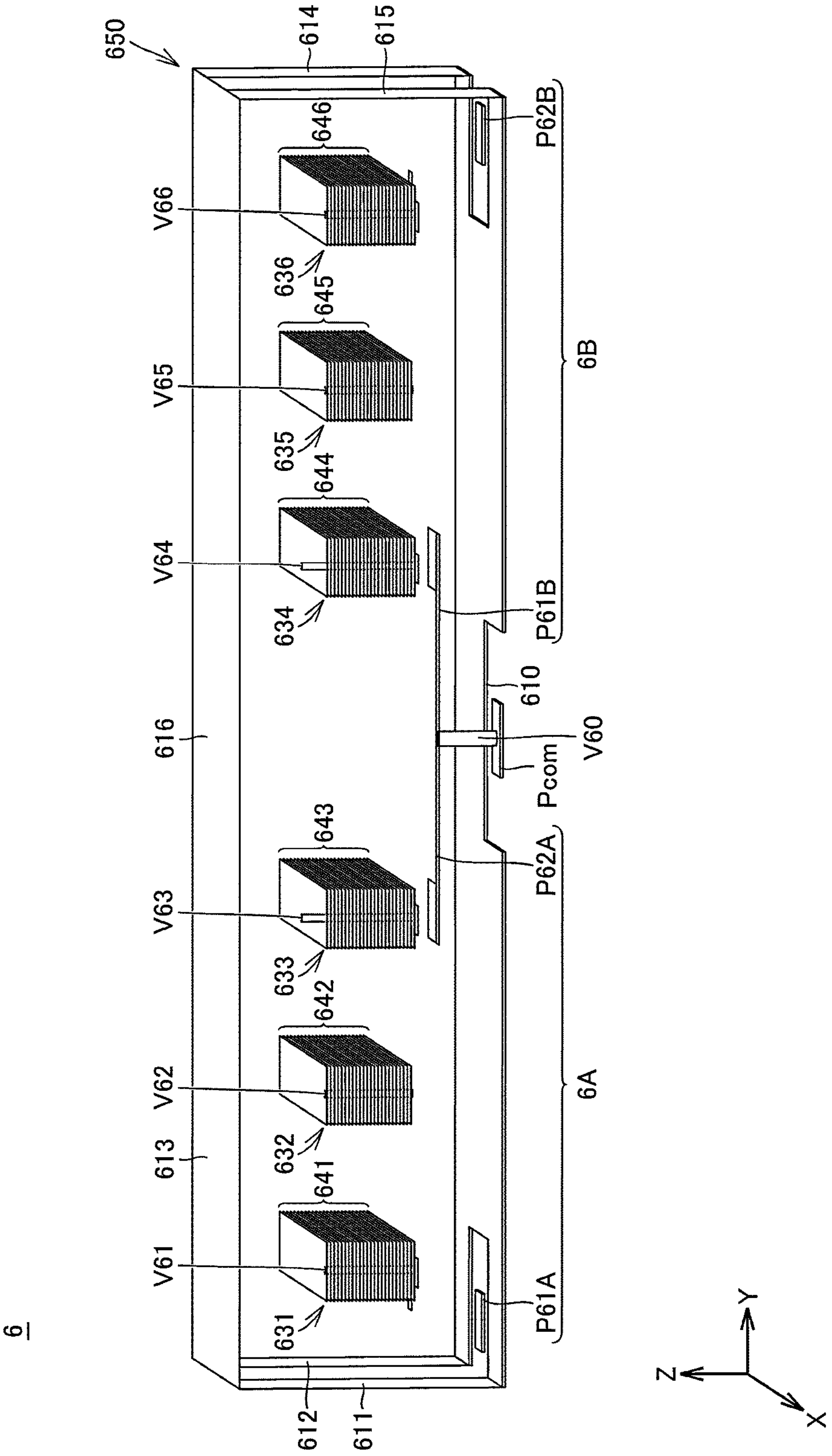
FIG. 32 is a perspective view of the duplexer of FIG. 30.

FIG. 31 and FIG. 32 are perspective views of the duplexer of FIG. 30. With reference to FIG. 31 and FIG. 32, the multiplexer 6 has, for example, a rectangular or substantially rectangular parallelepiped shape. The multiplexer 6 further includes a dielectric substrate 600, a ground terminal 610, shield electrodes 611, 612, 613, 614, 615, and 616, and ground electrodes 621 and 622. The dielectric filter 6A includes distributed elements 631, 632, and 633. The dielectric filter 6B includes distributed elements 634, 635, and 636.

The dielectric substrate 600 includes a plurality of dielectric layers stacked in the Z-axis direction. The distributed elements 631 to 636 each extend in the X-axis direction inside the dielectric substrate 600. The X-axis direction length, Y-axis direction length, and Z-axis direction length of each of the distributed elements 631 to 636 are the same or substantially the same as the X-axis direction lengths, Y-axis direction lengths, and Z-axis direction lengths of the other distributed elements, respectively. The distributed elements 631 to 636 are linearly disposed in this order in the Y-axis direction between the ground electrodes 621 and 622. Note that the distributed elements 631 to 636 are not necessarily linearly disposed and may be disposed in a diamond or staggered (zigzag) shape, for example.

The input/output terminals P61A and P62B are electrically connected to the distributed elements 631 and 636, respectively, with via conductors and line conductors interposed therebetween. The input/output terminals P62A and P61B are electrically connected to the distributed elements 633 and 634, respectively, and are connected to the common terminal Pcom by a via conductor V60. When the dielectric filters 6A and 6B are viewed from the Z-axis direction in plan view, the input/output terminals P62A and P61B are overlapped with the distributed elements 633 and 634, respectively. Note that the input/output terminals P62A and P61B may be overlapped with the distributed elements 632 and 635, respectively.

Signals input to the input/output terminals P61A and P62B are output from the common terminal Pcom. A signal input to the common terminal Pcom is output from the input/output terminal P61A or P62B at the frequency of the signal.

The outermost surfaces of the multiplexer 6 in the Z-axis direction are referred to as upper surface UF6 and lower surface BF6. The upper surface UF6 and the lower surface BF6 face each other in the Z-axis direction. The surfaces parallel or substantially parallel to the Z-axis direction and the ZX plane are referred to as side surfaces SF61 and SF63. The surfaces parallel or substantially parallel to the Z-axis direction and the YZ plane are referred to as side surfaces SF62 and SF64.

On the lower surface BF6, the input/output terminals P61A and P62B, the common terminal Pcom, and the ground terminal 610 are provided. The input/output terminals P1 and P2 and the ground terminal 610 are, for example, land grid array (LGA) terminals with plane electrodes regularly disposed on the lower surface BF6. The lower surface BF6 is connected to a circuit board, which is not illustrated.

On the upper surface UF6, the shield electrode 616 is provided. The shield electrode 616 covers the upper surface UF6.

On the side surface SF61, the shield electrodes 611 and 612 are provided. The shield electrodes 611 and 612 are spaced away from each other in the X-axis direction. The shield electrodes 611 and 612 are each connected to the ground terminal 610, the ground electrodes 621 and 622, and the shield electrode 616.

On the side surface SF63, the shield electrodes 614 and 615 are provided. The shield electrodes 614 and 615 are spaced away from each other in the X-axis direction. The shield electrodes 614 and 615 are each connected to the ground terminal 610, the ground electrodes 621 and 622, and the shield electrode 616.

On the side surface SF62, the shield electrode 613 is provided. The shield electrode 613 covers the side surface SF62. The shield electrode 613 is connected to the ground terminal 610, the ground electrodes 621 and 622, and the shield electrodes 612, 614, and 616.

On the side surface SF64, no shield electrode is provided.

The ground terminal 610 and the shield electrodes 611 to 616 define a shield conductor portion 650. When the shield conductor portion 650 is viewed from the X-axis direction in plan view, the shield conductor portion 650 is provided on the surface of the dielectric substrate 600 to wind around the distributed elements 631 to 636.

The end portion on the side surface SF64 side (one end) of each of the distributed elements 631 to 636 is not connected to the shield conductor portion 650. That is, the one end of each of the distributed elements 631 to 634 is an open end that may have a variable voltage. The end portion on the side surface SF62 side (other end) of each of the distributed elements 631 to 636 is connected to the shield electrode 613. That is, the other end of each of the distributed elements 631 to 636 is a fixed end at a voltage fixed to the reference voltage of the shield conductor portion 650.

The X-axis direction length of each of the distributed elements 631 to 636 is approximately one fourth of the wavelength of a desired signal that can pass through the multiplexer 6. That is, the distributed elements 631 to 636 are each a $\lambda/4$ resonator. The dielectric filters 6A and 6B are each a three-stage dielectric filter including the three $\lambda/4$ resonators.

The distributed elements 631 to 636 include respective pluralities of conductors 641 to 646. The plurality of conductors 641 each define a distributed constant line that extends in the X-axis direction and has the Z-axis direction as the normal thereof. The plurality of conductors 641 are each provided on any of the plurality of dielectric layers of the dielectric substrate 600. That is, the plurality of conductors 641 are stacked in the Z-axis direction with an interval corresponding to the dielectric layer thickness. With regard to the plurality of conductors 641, the intervals between the conductors adjacent to each other in the Z-axis direction may be different from each other. The pluralities of conductors 642 to 646 are each configured the same or substantially the same as the plurality of conductors 641.

The distributed elements 631 to 636 include respective via conductors V61 to V66. At the one end of the distributed element 631, the plurality of conductors 641 are connected to each other by the via conductor V61 (short circuit conductor portion). At the one end of the distributed element 632, the plurality of conductors 642 are connected to each other by the via conductor V62 (short circuit conductor portion). At the one end of the distributed element 633, the plurality of conductors 643 are connected to each other by the via conductor V63 (short circuit conductor portion). At the one end of the distributed element 634, the plurality of conductors 644 are connected to each other by the via conductor V64 (short circuit conductor portion). At the one end of the distributed element 635, the plurality of conductors 645 are connected to each other by the via conductor V65 (short circuit conductor portion). At the one end of the distributed element 636, the plurality of conductors 646 are connected to each other by the via conductor V66 (short circuit conductor portion).

At the open end of each of the distributed elements 631 to 636, the plurality of conductors of the distributed element are connected to each other so that the potentials (polarities) of the plurality of respective conductors are matched with each other. Thus, the resonant modes of currents that flow through the plurality of respective conductors can be matched with each other. As a result, the directions in which currents flow through the plurality of respective conductors can be matched with each other.

The dielectric filters of the multiplexer according to Preferred Embodiment 6 are not limited to the three-stage dielectric filters and may be, for example, two-stage dielectric filters, such as the dielectric filter according to Preferred Embodiment 4 or the modification of Preferred Embodiment 4 and the dielectric filter according to Preferred Embodiment 5 or the modification of Preferred Embodiment 5, or dielectric filters with four or more stages. Further, the number of dielectric filters of the multiplexer according to Preferred Embodiment 6 is not limited to two and may be three or more. That is, the multiplexer according to Preferred Embodiment 6 is not limited to a duplexer and a diplexer, and examples thereof include triplexers, quadplexers, and pentaplexers.

From the above, with the multiplexer according to Preferred Embodiment 6, a reduction in loss can be achieved.

The dielectric resonators according to the above-described preferred embodiments and modifications thereof can each be provided as a coaxial dielectric resonator including an inner conductor and an outer conductor. In this case, the distributed element and shield conductor portion of the dielectric resonators according to the above-described preferred embodiments and modifications thereof can each correspond to the inner conductor and outer conductor of the coaxial dielectric resonator, respectively. That is, the dielectric resonators according to the above-described preferred embodiments and modifications thereof can each provide a coaxial dielectric resonator including an inner conductor divided into a plurality of conductors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dielectric resonator comprising:

a dielectric substrate;

a distributed element extending in a first direction inside the dielectric substrate; and a shield conductor portion on a surface of the dielectric substrate and winds around the distributed element when the distributed element is viewed from the first direction in plan view; wherein one end of the distributed element is not connected to the shield conductor portion;

the distributed element includes a plurality of conductors; and a thickness in the first direction of each of the plurality of conductors is larger than a skin depth of each of the plurality of conductors.

2. The dielectric resonator according to claim 1, wherein the dielectric substrate includes a plurality of dielectric layers stacked in a second direction orthogonal or substantially orthogonal to the first direction;

the plurality of conductors each define a distributed constant line extending in the first direction and with the second direction as a normal thereof; and the plurality of conductors are on at least two dielectric layers of the plurality of dielectric layers.

3. The dielectric resonator according to claim 2, wherein a number of the at least two dielectric layers is 13 or more.

4. The dielectric resonator according to claim 2, wherein a length in the first direction of each of the plurality of conductors is equal or substantially equal to a length in the first direction of the dielectric substrate.

5. The dielectric resonator according to claim 2, wherein the distributed element further includes a short circuit conductor portion to connect the plurality of conductors to each other at the one end.

6. The dielectric resonator according to claim 5, wherein the short circuit conductor portion is outside the dielectric substrate.

7. The dielectric resonator according to claim 2, wherein the plurality of conductors are each connected to the shield conductor portion at another end of the distributed element.

8. The dielectric resonator according to claim 2, wherein the plurality of conductors include a first conductor, a second conductor, a third conductor, and a fourth conductor; and the third conductor and the fourth conductor are between the first conductor and the second conductor in the second direction and separated from each other in a third direction orthogonal or substantially orthogonal to each of the first direction and the second direction.

9. The dielectric resonator according to claim 2, wherein a length of the distributed element in a third direction orthogonal or substantially orthogonal to each of the first direction and the second direction is a specific length;

the plurality of conductors include a first conductor, a second conductor, and a third conductor;

a conductor of the plurality of conductors other than the first conductor and the second conductor is between the first conductor and the second conductor;

a length in the third direction of each of the first conductor and the second conductor is shorter than the specific length; and a length of the third conductor is the specific length.

10. A dielectric filter comprising:

a dielectric substrate;

a plurality of distributed elements extending in a first direction inside the dielectric substrate;

a first terminal and a second terminal electrically connected to the plurality of distributed elements; and a shield conductor portion on a surface of the dielectric substrate and winds around the plurality of distributed elements when the plurality of distributed elements are viewed from the first direction in plan view; wherein one end of each of the plurality of distributed elements is not connected to the shield conductor portion;

at least one distributed element of the plurality of distributed elements includes a plurality of conductors;

the dielectric substrate includes a plurality of dielectric layers stacked in a second direction orthogonal or substantially orthogonal to the first direction;

the plurality of conductors each define a distributed constant line extending in the first direction and with the second direction as a normal thereof;

the plurality of conductors are on at least 13 dielectric layers of the plurality of dielectric layers; and a thickness in the first direction of each of the plurality of conductors is larger than a skin depth of each of the plurality of conductors.

11. The dielectric filter according to claim 10, wherein a length in the first direction of each of the plurality of conductors is equal or substantially equal to a length in the first direction of the dielectric substrate.

12. The dielectric filter according to claim 10, wherein the at least one distributed element further includes a short circuit conductor portion to connect the plurality of conductors to each other at the one end.

13. The dielectric filter according to claim 12, wherein the short circuit conductor portion is outside the dielectric substrate.

14. The dielectric filter according to claim 10, wherein the plurality of conductors are each connected to the shield conductor portion at another end of each of the plurality of distributed elements.

15. The dielectric filter according to claim 10, wherein the plurality of conductors include a first conductor, a second conductor, a third conductor, and a fourth conductor; and the third conductor and the fourth conductor are between the first conductor and the second conductor in the first direction and separated from each other in a third direction orthogonal or substantially orthogonal to each of the first direction and the second direction.

16. The dielectric filter according to claim 10, wherein a length of each of the plurality of distributed elements in a third direction orthogonal or substantially orthogonal to each of the first direction and the second direction is a specific length;

the plurality of conductors include a first conductor, a second conductor, and a third conductor;

a conductor of the plurality of conductors other than the first conductor and the second conductor is between the first conductor and the second conductor;

a length in the third direction of each of the first conductor and the second conductor is shorter than the specific length; and a length of the third conductor is the specific length.

17. A multiplexer comprising:

a first dielectric filter and a second dielectric filter according to claim 10.

18. The multiplexer according to claim 17, further comprising a common terminal connected to the second terminal of the first dielectric filter and the first terminal of the second dielectric filter.

19. The dielectric filter according to claim 10, wherein the plurality of conductors include at least 13 conductor layers that are on the at least 13 dielectric layers of the plurality of dielectric layers.

* * * * *